US012605947B2

(12) United States Patent
Nishizawa

(10) Patent No.: US 12,605,947 B2
(45) Date of Patent: Apr. 21, 2026

(54) PRINTING DEVICE

(71) Applicant: MIMAKI ENGINEERING CO., LTD., Nagano (JP)

(72) Inventor: Shinya Nishizawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 145 days.

(21) Appl. No.: 18/728,451

(22) PCT Filed: Jan. 19, 2023

(86) PCT No.: PCT/JP2023/001600
§ 371 (c)(1),
(2) Date: Jul. 11, 2024

(87) PCT Pub. No.: WO2023/140341
PCT Pub. Date: Jul. 27, 2023

(65) Prior Publication Data
US 2025/0108637 A1 Apr. 3, 2025

(30) Foreign Application Priority Data
Jan. 20, 2022 (JP) ................................ 2022-007266

(51) Int. Cl.
*B41J 11/70* (2006.01)
*B41J 11/00* (2006.01)
(Continued)

(52) U.S. Cl.
CPC .......... *B41J 11/663* (2013.01); *B41J 11/0095* (2013.01); *B41J 11/42* (2013.01);
(Continued)

(58) Field of Classification Search
CPC ....... B41J 11/663; B41J 11/0095; B41J 11/42; B41J 11/66; B41J 11/70; B41J 11/706; B41J 15/04; B41J 15/16
See application file for complete search history.

(56) References Cited

U.S. PATENT DOCUMENTS

2001/0000463 A1* 4/2001 Kaya .................... B41J 11/0065 400/621
2007/0014604 A1* 1/2007 Arai .................... G03G 15/6523 399/341
2020/0307272 A1* 10/2020 Suzuki .................... B41J 11/66

FOREIGN PATENT DOCUMENTS

JP 2004338322 A * 12/2004 .............. B41J 11/70
JP 2010247915 11/2010
(Continued)

OTHER PUBLICATIONS

"International Search Report (Form PCT/ISA/210) of PCT/JP2023/001600", mailed on Apr. 4, 2023, with English translation thereof, pp. 1-4.

*Primary Examiner* — Yaovi M Ameh
(74) *Attorney, Agent, or Firm* — JCIPRNET

(57) ABSTRACT

A printing device is provided. The printing device prints a cut position mark for specifying a medium cut position that is a cut position of a medium in a medium transport direction at a position separated by a certain distance from each of multiple medium cut positions on an transport direction upstream side, and prints a first cut range mark disposed at a position corresponding to one end of the medium cut range that is a cut range of the medium in the medium width direction at the medium cut position and a second cut range mark disposed at a position corresponding to the other end of the medium cut range.

12 Claims, 12 Drawing Sheets

(51) Int. Cl.
*B41J 11/42* (2006.01)
*B41J 11/66* (2006.01)
*B41J 15/04* (2006.01)
*B41J 15/16* (2006.01)

(52) U.S. Cl.
CPC ................ *B41J 11/66* (2013.01); *B41J 11/70* (2013.01); *B41J 11/706* (2013.01); *B41J 15/04* (2013.01); *B41J 15/16* (2013.01)

(56) References Cited

FOREIGN PATENT DOCUMENTS

| | | | | |
|---|---|---|---|---|
| JP | 2011177950 | | 9/2011 | |
| JP | 2011177950 A | * | 9/2011 | ............ B41J 11/008 |
| JP | 2020163726 | | 10/2020 | |

* cited by examiner

PRINTING DEVICE

CROSS-REFERENCE TO RELATED APPLICATION

This application is a 371 application of the International PCT application serial no. PCT/JP2023/001600, filed on Jan. 19, 2023, which claims the priority benefits of Japan Patent Application No. 2022-007266, filed on Jan. 20, 2022. The entirety of each of the above-mentioned patent applications is hereby incorporated by reference herein and made a part of this specification.

TECHNICAL FIELD

The present invention relates to a printing device for performing printing on a long medium.

BACKGROUND ART

Conventionally, a printer that performs printing on a long sheet-shaped medium is known (refer to, for example, Patent Literatures 1 to 3).

A printer disclosed in Patent Literature 1 includes a transport mechanism that transports a medium in a longitudinal direction of the medium, a printer head that performs printing on the medium, and a cutting head that cuts the medium into a predetermined shape. The printer head and the cutting head are supported by a common guide rail and are slidable in a width direction of the medium orthogonal to the longitudinal direction of the medium.

In this printer, the medium after being printed by the print head is cut into a predetermined shape by the cutting head. In this printer, when the medium includes a mount and a sealant releasably attached to the mount, half-cutting in which only the sealant is cut into a predetermined shape by the cutting head is performed on the medium.

In the printer disclosed in Patent Literature 1, a medium before printing is wound in a roll shape. The medium wound in a roll shape before printing is attached to a medium feed unit. The medium after being half-cut is wound in a roll shape. The half-cut medium wound in a roll shape is attached to a medium winding unit. When the medium is subjected to printing, the medium is transported in a direction from the medium feed unit toward the print head. When the medium is half-cut, the medium is transported in a direction from the medium feed unit toward the cutting head and also transported in an opposite direction from the cutting head toward the medium feed unit.

A printer disclosed in Patent Literature 2 includes a transport roller and a pinch roller that transport a medium in a longitudinal direction of the medium, a recording head that performs printing on the medium, a carriage on which the recording head is mounted, a platen disposed at a position facing the recording head, a cutter that cuts the medium after printing in a width direction of the medium orthogonal to a transport direction of the medium, and a slitter that cuts the medium after printing in the transport direction of the medium.

A printer disclosed in Patent Literature 3 includes a print unit that performs printing on a medium and a cutter unit that cuts the medium after printing in a width direction of the medium. The print unit prints an image on the medium and prints a cut mark in a margin region between the images on the medium. The cutter unit includes a cut mark sensor that detects the cut mark. When the cut mark is detected by the cut mark sensor, the cutter unit transports the medium by a predetermined distance, stops the medium, and then cuts the medium in a width direction of the medium.

CITATION LIST

Patent Literature

Patent Literature 1: Japanese Unexamined Patent Publication No. 2010-247915

Patent Literature 2: Japanese Unexamined Patent Publication No. 2020-163726

Patent Literature 3: Japanese Unexamined Patent Publication No. 2011-177950

SUMMARY OF INVENTION

Technical Problems

The inventor of the present application has studied cutting a medium in a width direction of the medium and cutting a medium in a transport direction of the medium as in the printer disclosed in Patent Literature 2 after performing half-cutting on the medium after printing as in the printer disclosed in Patent Literature 1.

When the medium is half-cut, the medium is also transported in the opposite direction. Thus, when the medium is cut in the transport direction of the medium while being half-cut, the medium may not be appropriately cut due to the influence of the medium being transported in the opposite direction.

Therefore, the inventor of the present application has studied that a medium after printing and half-cutting be not cut in a width direction of the medium and a transport direction of the medium, but be temporarily wound in a roll shape, and the medium wound in a roll shape be refed and is cut in the width direction of the medium and the transport direction of the medium.

In this case, a leading end of the medium (the leading end in the longitudinal direction of the medium) when printing and half-cutting are performed becomes a trailing end of the medium (the trailing end in the longitudinal direction of the medium) when the medium is cut in the width direction of the medium and the transport direction of the medium. The trailing end of the medium when printing and half-cutting are performed becomes a leading end of the medium when the medium is cut in the width direction of the medium and the transport direction of the medium.

The inventor of the present application has studied cutting a part of a medium in the width direction of the medium linearly in the width direction of the medium instead of cutting the medium in the entire region in the width direction of the medium so that a margin portion wound in a roll shape by the medium winding unit is continuously formed in the transport direction of the medium on the medium after a portion on which the printing and half-cutting have been performed is cut.

In this case, a standard for appropriately cutting a part of the medium in the width direction of the medium is required, but how to provide the standard for appropriately cutting a part of the medium in the width direction of the medium has not yet been proposed.

Therefore, an object of the present invention is to provide a printing device that performs printing on a long medium to be cut after printing, the printing device being capable of printing a mark for appropriately cutting the medium in a width direction of the medium even in a case where the medium after printing wound in a roll shape is refed and is cut in the width direction of the medium and a transport direction of the medium, and even in a case where a part of the medium in the width direction of the medium is cut in the width direction of the medium.

Solutions to Problems

In order to solve the above problems, according to the present invention, there is provided a printing device that performs printing on a long medium to be cut after printing, the printing device including: a printing mechanism configured to perform printing on the medium; a medium transport mechanism configured to transport the medium in a longitudinal direction of the medium; a medium feed unit to which the medium wound in a roll shape before being transported toward the printing mechanism is attached; and a medium winding unit to which the medium wound in a roll shape after passing through the printing mechanism is attached, in which, when a width direction of the medium orthogonal to a medium transport direction that is a transport direction of the medium is defined as a medium width direction, a side on which the medium feed unit is disposed in the medium transport direction is defined as a transport direction upstream side, a side on which the medium winding unit is disposed in the medium transport direction is defined as a transport direction downstream side, a cut position in the medium transport direction of the medium linearly cut in the medium width direction after printing is defined as a medium cut position, and a cut range of the medium in the medium width direction at the medium cut position is defined as a medium cut range. The printing mechanism is configured to: receive an image data that is data of an image to be printed on the medium, a first mark printing data that is data for printing a cut position mark for specifying the medium cut position on the medium, and a second mark printing data that is data for printing, on the medium, a first cut range mark disposed at a position corresponding to one end of the medium cut range in the medium width direction and a second cut range mark disposed at a position corresponding to the other end of the medium cut range in the medium width direction; print the image on the medium on the basis of the image data; prints a plurality of the cut position marks at positions separated by a certain distance from the plurality of respective medium cut positions on the transport direction upstream side on the basis of the first mark printing data; and print the first cut range mark and the second cut range mark on the medium on the basis of the second mark printing data.

In the printing device of the present invention, when a cut position in the medium transport direction of the medium linearly cut in the medium width direction after printing is defined as a medium cut position, the printing mechanism receives first mark printing data that is data for printing a cut position mark for specifying the medium cut position on the medium, and prints a plurality of cut position marks at positions separated from each of the plurality of medium cut positions by a certain distance on the transport direction upstream side on the basis of the first mark printing data. Thus, in the present invention, in a case where the medium after printing wound in a roll shape is refed and the medium is cut in the medium width direction, the cut position mark is disposed at a position separated from each of the medium cut positions by a certain distance on the transport direction downstream side. Therefore, in the present invention, the medium cut position can be recognized on the basis of the cut position mark even in a case where the medium after printing wound in a roll shape is refed and the medium is cut in the medium width direction and the medium transport direction.

In the present invention, when a cut range of the medium in the medium width direction at the medium cut position is defined as a medium cut range, the printing mechanism receives the first cut range mark disposed at a position corresponding to one end of the medium cut range in the medium width direction and the second mark printing data that is data for printing the second cut range mark disposed at a position corresponding to the other end of the medium cut range in the medium width direction on the medium, and prints the first cut range mark and the second cut range mark on the medium on the basis of the second mark printing data. Thus, in the present invention, even in a case where the medium after printing wound in a roll shape is refed and a part of the medium in the medium width direction is cut in the medium width direction, the medium cut range can be recognized on the basis of the first cut range mark and the second cut range mark.

As described above, in the present invention, even in a case where the medium after printing wound in a roll shape is refed and the medium is cut in the medium width direction and the medium transport direction, and a part of the medium in the medium width direction is cut in the medium width direction, the medium cut position and the medium cut range for appropriately cutting the medium in the medium width direction can be recognized on the basis of the cut position mark, the first cut range mark, and the second cut range mark. That is, in the present invention, even in a case where the medium after printing wound in a roll is refed and the medium is cut in the medium width direction and the medium transport direction, and a part of the medium in the medium width direction is cut in the medium width direction, a mark for appropriately cutting the medium in the medium width direction can be printed.

In the present invention, for example, in a case where the image data, the first mark printing data, the second mark printing data, and the like are created in a personal computer to which the printing device is electrically connected, and the medium after printing wound in a roll shape is refed and the medium is cut in the medium width direction, when data stored in the personal computer is transmitted to the cutting mechanism that cuts the medium in the medium width direction, the cutting mechanism can recognize the medium cut position and the medium cut range for appropriately cutting the medium in the medium width direction.

However, in this case, it is necessary for the personal computer to keep storing the data until the medium after printing wound in a roll shape is refed and the medium is cut in the medium width direction. Since the medium after printing is temporarily detached from the medium winding unit, in this case, when the medium is cut in the medium width direction, it is necessary to associate the refed medium with the data transmitted from the personal computer. In contrast, in the present invention, the personal computer does not need to keep storing the data in a case where the data is transmitted to the printing mechanism when the printing mechanism performs printing. In the present invention, it is not necessary to associate the refed medium with the data.

In the present invention, for example, the cut position mark is a straight line parallel to the medium width direction, the first cut range mark and the second cut range mark are straight lines parallel to the medium transport direction, and the printing mechanism is configured to: print the cut position mark on one end portion of the medium in the medium width direction, and print the first cut range mark and the second cut range mark on at least an end portion of the medium on the transport direction upstream side in a state in which the medium is wound by the medium winding unit.

In the present invention, when a cut position in the medium width direction of the medium linearly cut in the medium transport direction after printing is defined as a second medium cut position, preferably, the printing mechanism is configured to print the first cut range mark and the second cut range mark at the same position as the second medium cut position in the medium width direction. With this configuration, for example, in a case where a position of the second cutting mechanism in the medium width direction for cutting the medium after printing in the medium transport direction needs to be manually adjusted, the position of the second cutting mechanism in the medium width direction can be adjusted by using the first cut range mark and the second cut range mark as marks.

In the present invention, when the medium after the printing mechanism performs printing and after being detached from the medium winding unit is a post-printing medium. The printing device further includes: a first mark detection mechanism configured to detect the cut position mark printed on the post-printing medium; a second mark detection mechanism configured to detect the first cut range mark and the second cut range mark printed on the post-printing medium; a cutting mechanism configured to cut the post-printing medium in the medium width direction; and a second cutting mechanism configured to cut the post-printing medium in the medium transport direction. The cutting mechanism is configured to cut the post-printing medium in the medium width direction on the basis of detection results from the first mark detection mechanism and the second mark detection mechanism.

In the present invention, the printing mechanism, the cutting mechanism, and the second cutting mechanism are preferably attached to the same support body, and the post-printing medium wound in a roll shape is attached to the medium feed unit. With this configuration, a configuration of the printing device can be simplified compared with a case where a support body to which the printing mechanism is attached and a support body to which the cutting mechanism and the second cutting mechanism are attached are separately provided. With this configuration, a configuration of the printing device can be simplified compared with a case where a feed unit to which the roll-shaped post-printing medium fed toward the cutting mechanism and the second cutting mechanism is attached is separately provided in addition to the medium feed unit.

In the present invention, for example, the cutting mechanism includes: a cutter blade configured to cut the post-printing medium; a cutting carriage configured to hold the cutter blade; and a cutting carriage drive mechanism configured to move the cutting carriage in the medium width direction. The first mark detection mechanism is mounted on the cutting carriage, and the second mark detection mechanism is disposed further toward the transport direction upstream side than the cutting mechanism. The cutting mechanism is configured to: receive the cut range data that is data for specifying the medium cut range and is generated on the basis of detection results of the first cut range mark and the second cut range mark from the second mark detection mechanism, and cut the post-printing medium in the medium width direction on the basis of the received cut range data and a detection result from the first mark detection mechanism.

In the present invention, it is preferable that, the printing mechanism include: an inkjet head configured to eject ink onto the medium; a printing carriage on which the inkjet head is mounted; and a printing carriage drive mechanism configured to move the printing carriage in the medium width direction, and is disposed further toward the transport direction upstream side than the cutting mechanism and the second cutting mechanism. The second mark detection mechanism be mounted on the printing carriage. With this configuration, the first cut range mark and the second cut range mark can be detected by the second mark detection mechanism by using an operation of the printing carriage. Therefore, for example, a configuration of the printing device can be simplified compared with a case where a carriage on which the second mark detection mechanism is mounted is separately provided in addition to the printing carriage.

In the present invention, it is preferable that, the second mark detection mechanism is configured to detect the cut position mark printed on the post-printing medium. The cutting mechanism is configured to receive a mark position data that is generated on the basis of a detection result of the cut position mark from the second mark detection mechanism and is data for specifying a position of the cut position mark in the medium width direction. The cutting carriage drive mechanism is configured to move the cutting carriage to a position where the first mark detection mechanism is capable of detecting the cut position mark on the basis of the mark position data received by the cutting mechanism. With this configuration, the cutting carriage can be moved and stopped in advance at a position where the first mark detection mechanism can detect the cut position mark. Therefore, in a case where the medium is cut in the medium width direction, the first mark detection mechanism can quickly detect the cut position mark.

Effect of the Invention

As described above, according to the present invention, in the printing device that performs printing on a long medium to be cut after printing, a mark for appropriately cutting the medium in the width direction of the medium can be printed even in a case where the medium after printing wound in a roll shape is refed and the medium is cut in the width direction of the medium and the transport direction of the medium, and a part of the medium in the width direction of the medium is cut in the width direction of the medium.

DESCRIPTION OF EMBODIMENTS

Hereinafter, embodiments of the present invention will be described with reference to the drawings.

Embodiment 1 (Overall Configuration of Printing Device)

Figure 1:
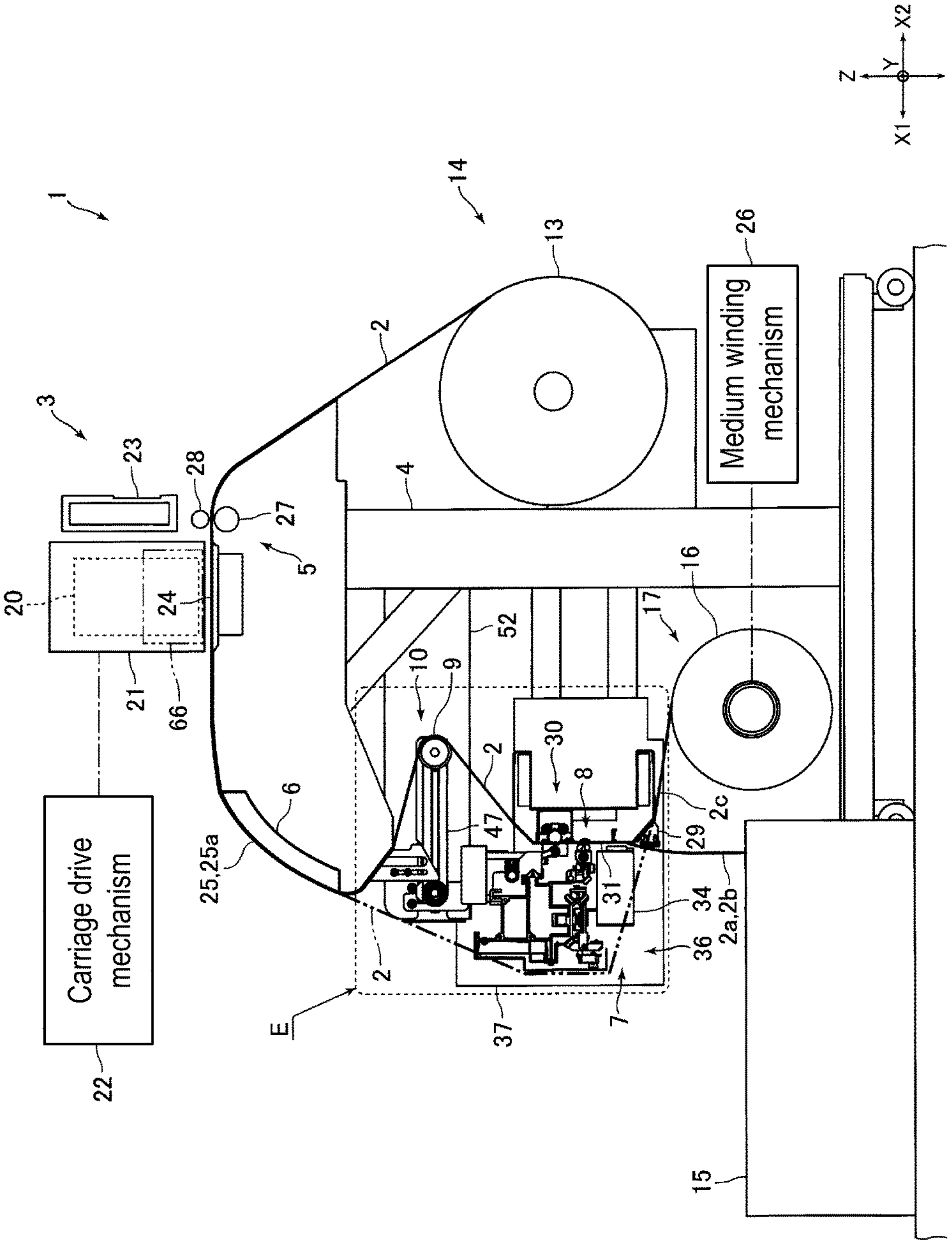
FIG. 1 is a side view for describing a configuration of a printing device according to Embodiment 1 of the present invention.
Figure 2:
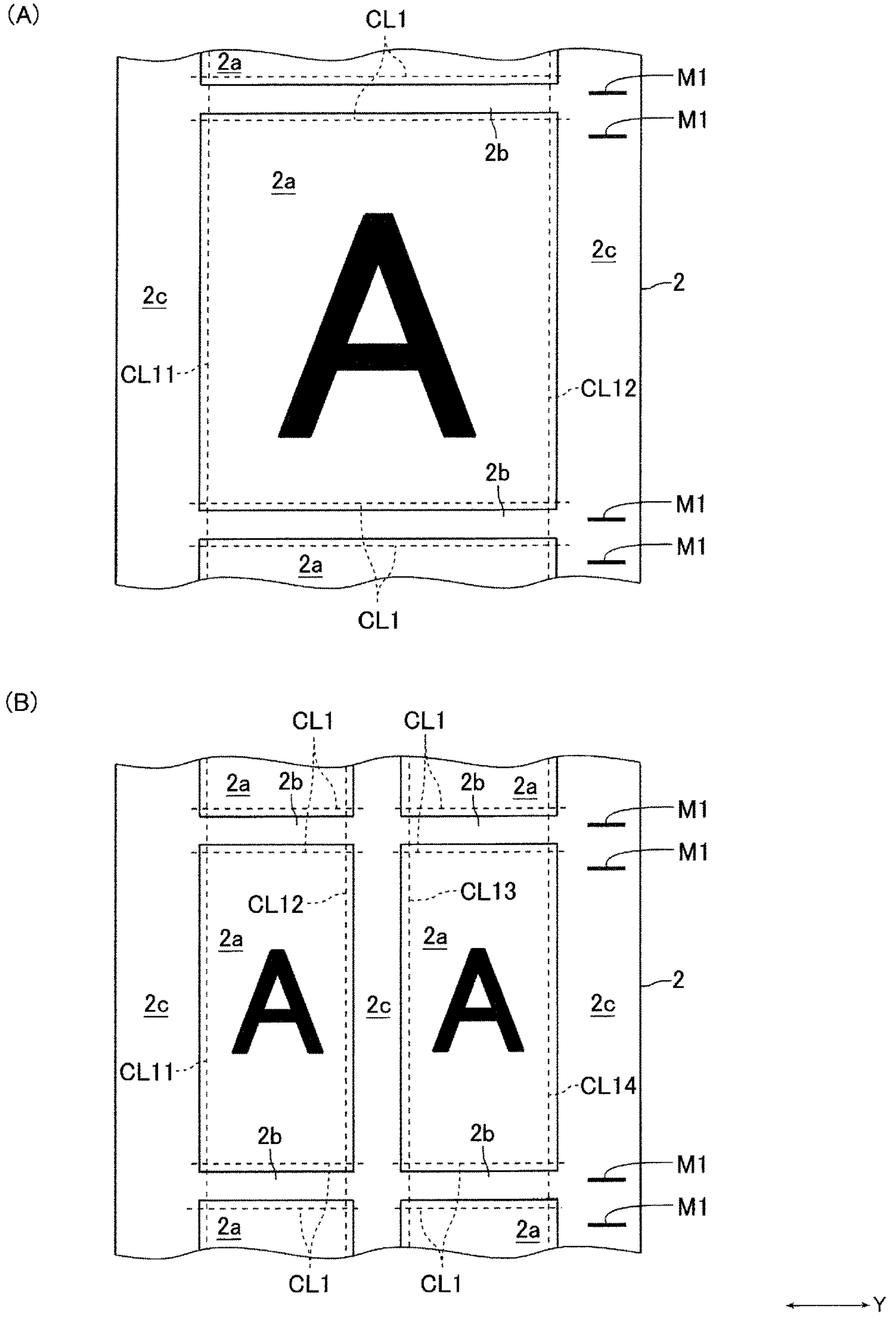
FIG. 2 is a diagram for describing a printing example of a medium using a printing mechanism illustrated in FIG. 1 and a cutting example of a medium using a cutting mechanism and a second cutting mechanism.

FIG. 1 is a side view for describing a configuration of a printing device 1 according to Embodiment 1 of the present invention. FIG. 2 is a diagram for describing a printing example of a medium 2 using a printing mechanism 3 illustrated in FIG. 1 and a cutting example of the medium 2 using a cutting mechanism 7 and a second cutting mechanism 8.

The printing device 1 of the present embodiment is a business inkjet printer having a function of performing printing on the long medium 2 and cutting the medium 2 after the printing into a predetermined shape. The printing device 1 performs printing on the long medium 2 to be cut after printing. The medium 2 is, for example, a sheet-shaped medium made of a resin such as polyvinyl chloride or polyethylene terephthalate (PET). The medium 2 may be a sheet-shaped medium made of paper such as transfer paper or photographic paper. The medium 2 may be made of tarpaulin or a window film.

The printing device 1 includes a printing mechanism 3 that performs printing on the long medium 2, a support body 4 that supports the printing mechanism 3 from below, a medium transport mechanism 5 that transports the medium 2, a heater (after heater) 6 that heats the medium 2 after printing, a cutting mechanism 7 that linearly cuts (slits) the medium 2 in a width direction of the medium 2 orthogonal to a transport direction of the medium 2, a second cutting mechanism 8 that linearly cuts (performs slit processing on) the medium 2 in the transport direction of the medium 2, and a tension applying mechanism 10 having a tension bar 9. The cutting mechanism 7 and the second cutting mechanism 8 cut the medium 2 after printing. The tension bar 9 contacts the medium 2 after printing to apply tension to the medium 2.

The tension bar 9 is disposed between the printing mechanism 3 and the cutting mechanism 7 in the transport direction of the medium 2 (a feed direction of the medium 2). The heater 6 is disposed between the printing mechanism 3 and the tension bar 9 in the transport direction of the medium 2. The second cutting mechanism 8 is disposed between the tension bar 9 and the cutting mechanism 7 in the transport direction of the medium 2. That is, the tension bar 9 is disposed between the printing mechanism 3 and the second cutting mechanism 8 in the transport direction of the medium 2.

The printing device 1 cuts a cutting target portion 2*a* (refer to FIG. 2) from the sheet-shaped medium 2 by using the cutting mechanism 7 and the second cutting mechanism 8. The cutting target portion 2*a* illustrated in FIG. 2 is a rectangular or square region including a printed portion on the medium 2.

The printing device 1 cuts the cutting target portion 2*a* illustrated in (A) of FIG. 2 or the cutting target portion 2*a* illustrated in (B) of FIG. 2 from the medium 2.

In FIG. 2, a portion of the medium 2 cut by the cutting mechanism 7 is indicated by a cut line (cut) CL1. Portions of the medium 2 cut by the second cutting mechanism 8 are indicated by cut lines CL11 to CL14. As illustrated in FIG. 2, the cut line CL1 parallel to the width direction of the medium 2 is formed on the medium 2 after being cut by the cutting mechanism 7. Cut lines CL11 to CL14 in the transport direction of the medium 2 are formed on the medium 2 cut by the second cutting mechanism 8.

In the present embodiment, the cut lines CL11 and CL12 or the cut lines CL13 and CL14 are formed on both sides of the cutting target portion 2*a* in the width direction of the medium 2. In the example illustrated in (A) of FIG. 2, a portion surrounded by the two cut lines CL1 and the two cut lines CL11 and CL12 is the cutting target portion 2*a*. In the example illustrated in (B) of FIG. 2, a portion surrounded by the two cut lines CL1 and the two cut lines CL11 and CL12 and a portion surrounded by the two cut lines CL1 and the two cut lines CL13 and CL14 are the cutting target portion 2*a*. In the printing device 1, the medium 2 passes through the second cutting mechanism 8 and the cutting mechanism 7 in this order. In the course of the medium 2 passing through the second cutting mechanism 8 and the cutting mechanism 7, the cut lines CL11 to CL14 and the cut line CL1 are sequentially formed on the medium 2.

The cutting mechanism 7 cuts the medium 2 to cross the cut lines CL11 to CL14 (that is, a portion of the medium 2 cut by the second cutting mechanism 8) and thus forms the cut line CL1. That is, both ends of the cut line CL1 in the width direction of the medium 2 are disposed outside the two cut lines CL11 and CL12 or the two cut lines CL13 and CL14 in the width direction of the medium 2.

The cutting mechanism 7 does not cut the medium 2 over the entire width direction of the medium 2, but cuts a part of the medium 2 in the width direction of the medium 2. For example, as illustrated in (B) of FIG. 2, in a case where two cutting target portions 2*a* are arranged side by side in the width direction of the medium 2, two cut lines CL1 respectively corresponding to the two cutting target portions 2*a* are formed at intervals in the width direction of the medium 2. In the present embodiment, there is a margin between the cutting target portions 2*a* in the transport direction of the medium 2 (up-down direction in FIG. 2). On both sides of the cutting target portion 2*a* in the width direction of the medium 2 (left-right direction in FIG. 2), there are margin portions elongated in the transport direction of the medium 2.

As illustrated in FIG. 1, the printing device 1 includes a medium feed unit 14 that holds a feed roll 13, a container 15, and a medium winding unit 17 that holds a winding roll 16.

The feed roll 13 is the medium 2 before printing wound in a roll shape. A first margin portion 2*b* and the cutting target portion 2*a* are accommodated in the container 15. The first margin portion 2*b* is a margin portion located between the cutting target portions 2*a* in the transport direction of the medium 2. The winding roll 16 is formed by winding a second margin portion 2*c* of the medium 2 in a roll shape. Here, the second margin portion 2*c* is a margin portion on both sides of the cutting target portion 2*a* in the width direction of the medium 2 and a margin portion on both sides of the first margin portion 2*b*.

That is, the printing device 1 includes the medium feed unit 14 to which the medium 2 wound in a roll shape before being transported toward the printing mechanism 3 is attached, and the medium winding unit 17 to which the medium 2 (more specifically, a part of the medium 2) wound in a roll shape after passing through the printing mechanism 3 is attached.

The printing mechanism 3 includes an inkjet head 20 (hereinafter, referred to as a "head 20") that ejects ink onto the medium 2, a carriage 21 (printing carriage) on which the head 20 is mounted, a carriage drive mechanism 22 (printing carriage drive mechanism) that moves the carriage 21 in a main scanning direction (Y direction in FIG. 1 and the like) that is a width direction of the medium 2, a support frame 23 that supports the carriage 21 to be movable in the main scanning direction, and a print platen 24 disposed below the carriage 21.

The head 20 ejects ink downward. The carriage drive mechanism 22 includes, for example, a belt partially fixed to the carriage 21, a pulley around which the belt is stretched, and a motor that rotates the pulley. The medium 2 is placed on the print platen 24 at the time of printing.

In the following description, a main scanning direction (width direction and Y direction of medium 2) will be referred to as a "left-right direction", and a direction orthogonal to the up-down direction (Z direction in FIG. 1 and the like) and the left-right direction will be referred to as a "front-rear direction". An X1 direction side in FIG. 1 and the like, which is one side in the front-rear direction, will be referred to as a "front" side, and an X2 direction side in FIG. 1 and the like, which is the opposite side, will be referred to as a "rear" side. In the present embodiment, the medium 2 before printing is transported from the rear side to the upper surface of the print platen 24, and the medium 2 after printing is transported from the upper surface of the print platen 24 to the front side.

In the present embodiment, the side on which the medium feed unit 14 is disposed in the transport direction of the medium 2 is an upstream side in the transport direction of the medium 2, and the side on which the medium winding unit 17 is disposed in the transport direction of the medium 2 is a downstream side in the transport direction of the medium 2.

In the following description, the transport direction of the medium 2 may be referred to as a "medium transport direction", and the width direction of the medium 2 orthogonal to the transport direction of the medium 2 may be referred to as a "medium width direction". In the following description, the upstream side in the transport direction of the medium 2 may be referred to as a "transport direction upstream side", and the downstream side in the transport direction of the medium 2 may be referred to as a "transport direction downstream side".

As illustrated in FIG. 1, an after-printing platen 25 is disposed on the front side of the print platen 24. A guide surface 25*a* that guides the medium 2 transported from the print platen 24 toward the tension bar 9 is provided on the surface of the after-printing platen 25. The guide surface 25*a* is provided in a protruding curved surface shape. The medium 2 transported from the print platen 24 toward the tension bar 9 comes into contact with the guide surface 25*a*. The heater 6 is disposed inside the after-printing platen 25 along the guide surface 25*a*.

The medium transport mechanism 5 transports the long medium 2 in the longitudinal direction of the medium 2. The medium transport mechanism 5 includes a transport roller 27 and a pad roller 28 disposed to face the transport roller 27. The transport roller 27 is biased toward the pad roller 28, and can hold the medium 2 between itself and the transport roller 27.

The transport roller 27 and the pad roller 28 are disposed upstream of the print platen 24 in the transport direction of the medium 2. The medium transport mechanism 5 is disposed upstream of the tension bar 9 in the transport direction of the medium 2. The transport roller 27 is connected to a drive mechanism that rotates the transport roller 27. When the transport roller 27 is rotationally driven, the medium 2 is transported downstream while being sandwiched between the transport roller 27 and the pad roller 28.

The tension applying mechanism 10 is disposed below the after-printing platen 25. The second cutting mechanism 8 is disposed below the tension applying mechanism 10. The cutting mechanism 7 is disposed below the second cutting mechanism 8. A specific configuration of the tension applying mechanism 10 will be described later. A configuration of the cutting mechanism 7, a configuration of the second cutting mechanism 8, and specific configurations of peripheral portions of the cutting mechanism 7 and the second cutting mechanism 8 will be described later.

The medium feed unit 14 is disposed below the printing mechanism 3. The medium feed unit 14 includes a rotation shaft inserted through the inner peripheral side of the feed roll 13. The container 15 is provided in, for example, a rectangular parallelepiped box shape of which an upper surface is open. The container 15 is disposed below the cutting mechanism 7 and the second cutting mechanism 8. The container 15 is disposed below the cutting mechanism 7.

The medium winding unit 17 is disposed below the printing mechanism 3. The medium winding unit 17 is disposed below the cutting mechanism 7. The medium winding unit 17 is disposed behind the cutting mechanism 7, the second cutting mechanism 8, and the container 15. The medium winding unit 17 includes a medium winding mechanism 26 that winds the second margin portion 2*c*. The medium winding mechanism 26 includes a rotation shaft that is inserted into the inner peripheral side of the winding roll 16, a drive mechanism that rotates the rotation shaft, and a torque limiter that idles the winding roll 16 so that the tension of the second margin portion 2*c* wound around the winding roll 16 does not exceed a predetermined tension. An end portion of the medium 2 on the transport direction downstream side is fixed to the rotation shaft.

In the present embodiment, as illustrated in FIG. 2, a portion to be the cutting target portion 2*a* and the first margin portion 2*b* in the medium 2 is a first medium portion that is a portion of the medium 2 disposed on one side in the width direction of the medium 2 with the cut lines CL11 to CL14 as boundaries, and the first medium portion is accommodated in the container 15. In (A) of FIG. 2, a portion between the cut lines CL11 and CL12 corresponds to the first medium portion.

The second margin portion 2*c* is a second medium portion disposed on the other side in the width direction of the medium 2 with the cut lines CL11 to CL14 in the medium 2 as boundaries, and the medium winding mechanism 26 winds the second medium portion. In (A) of FIG. 2, a portion on the outer side (left side in the drawing) as viewed from the cut line CL11 and a portion on the outer side (right side in the drawing) as viewed from the cut line CL12 correspond to the second medium portion.

(Configurations of Cutting Mechanism, Second Cutting Mechanism, and Peripheral Portion)

Figure 3:
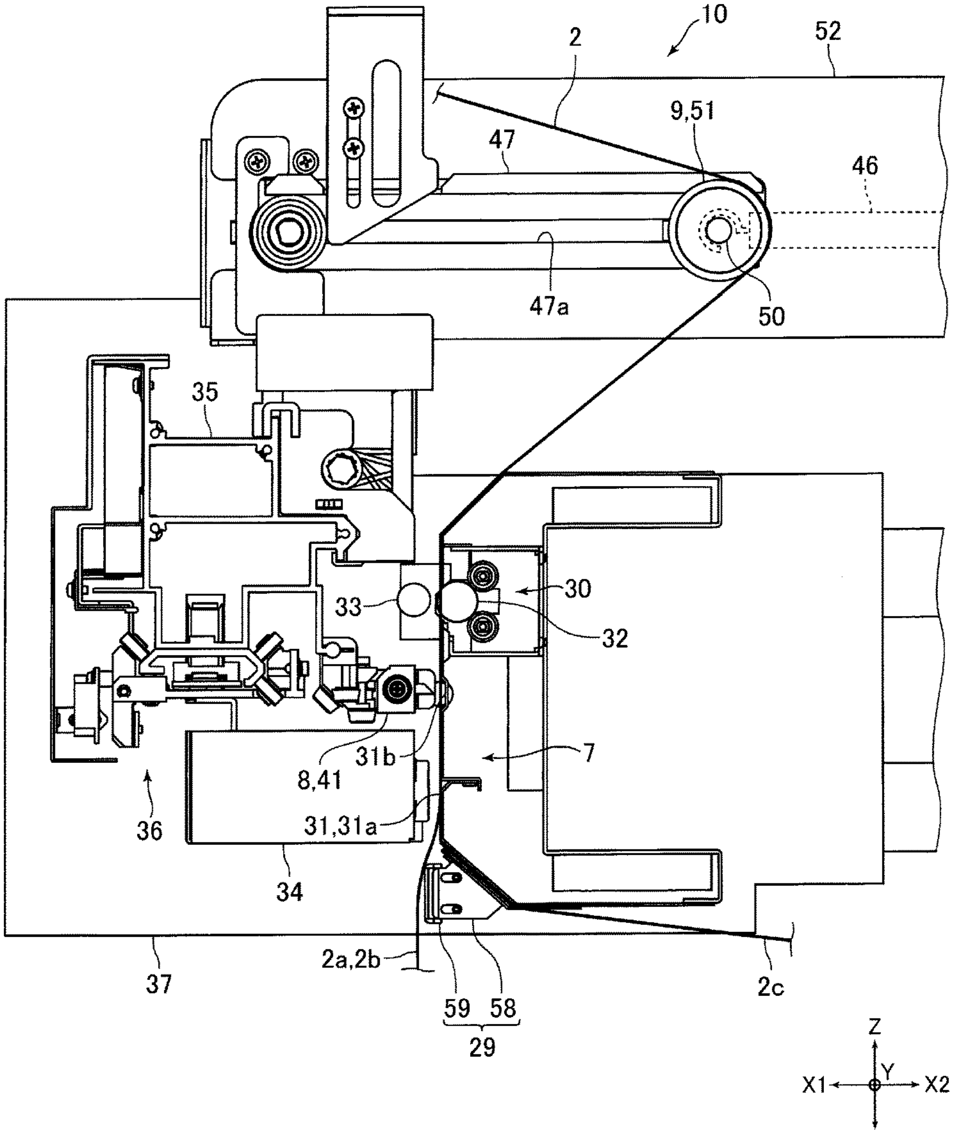
FIG. 3 is an enlarged view of a portion E in FIG. 1.
Figure 4:
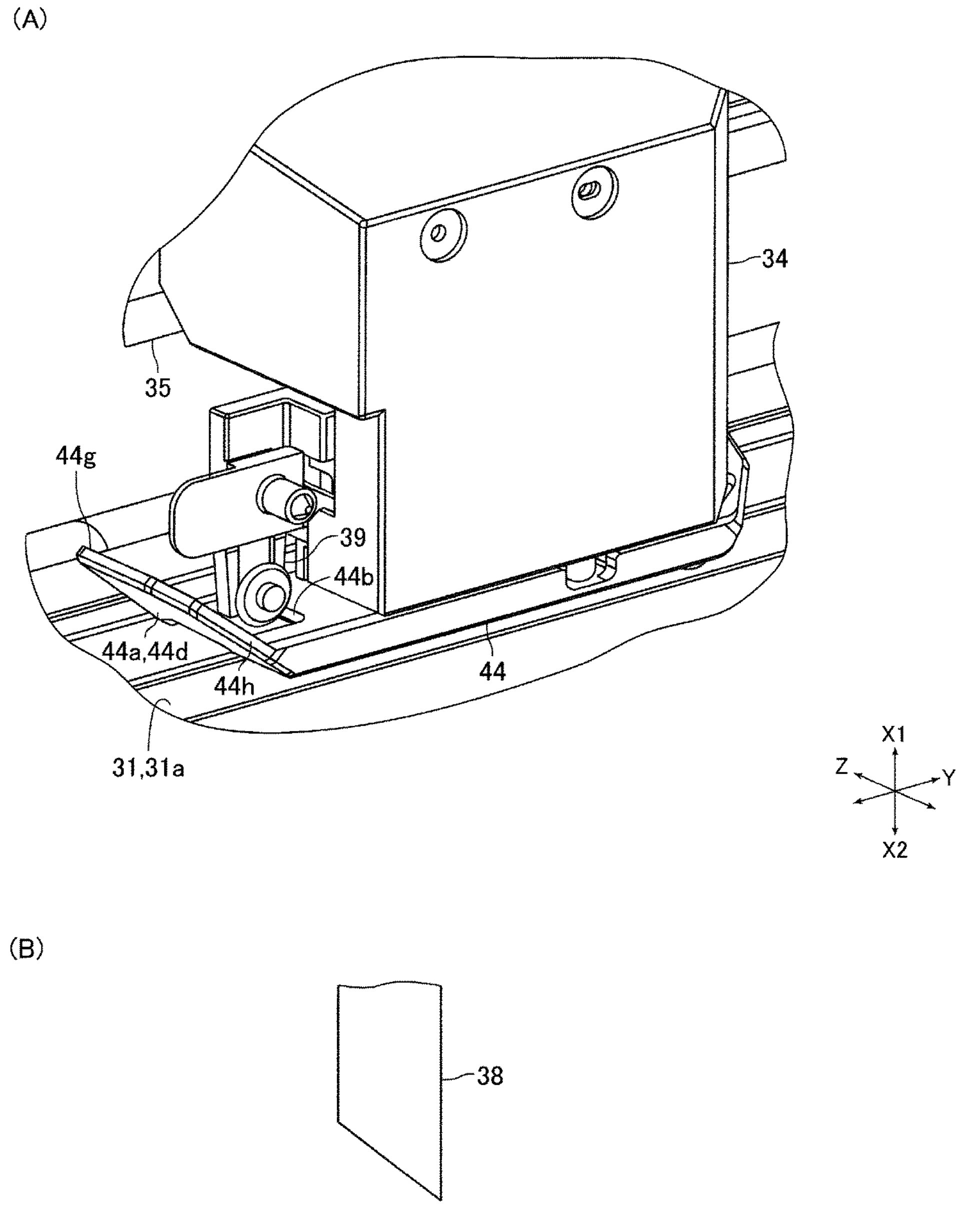
In FIG. 4, (A) is a perspective view of a part of a carriage, a medium pressing member, and the like of the cutting mechanism illustrated in FIG. 3, and (B) is a plan view of a tip side portion of a cutter blade of the cutting mechanism illustrated in FIG. 3.
Figure 5:
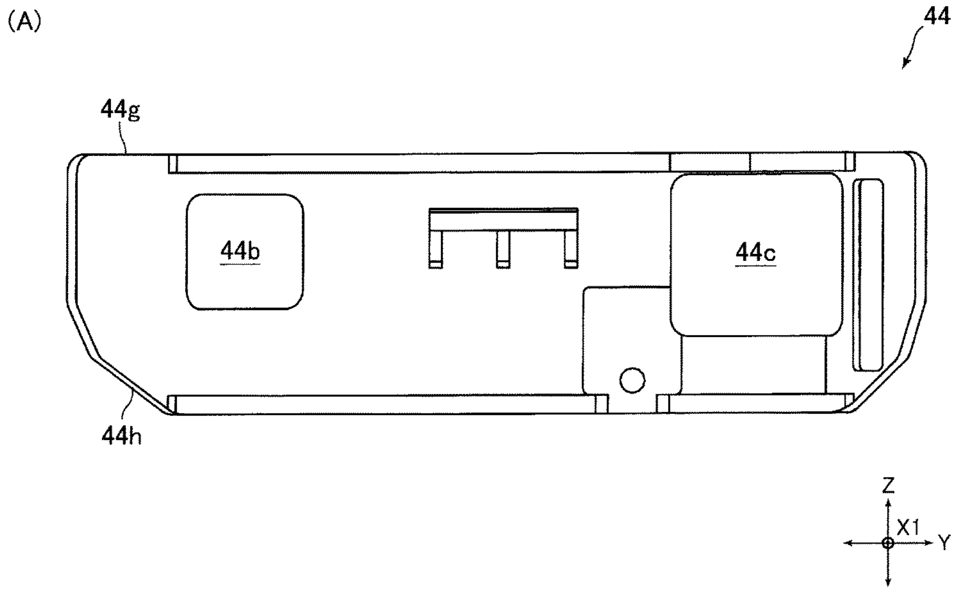
In FIG. 5, (A) is a front view of the medium pressing member illustrated in (A) of FIG. 4, and (B) is a plan view of the medium pressing member illustrated in (A) of FIG. 4.
Figure 5:
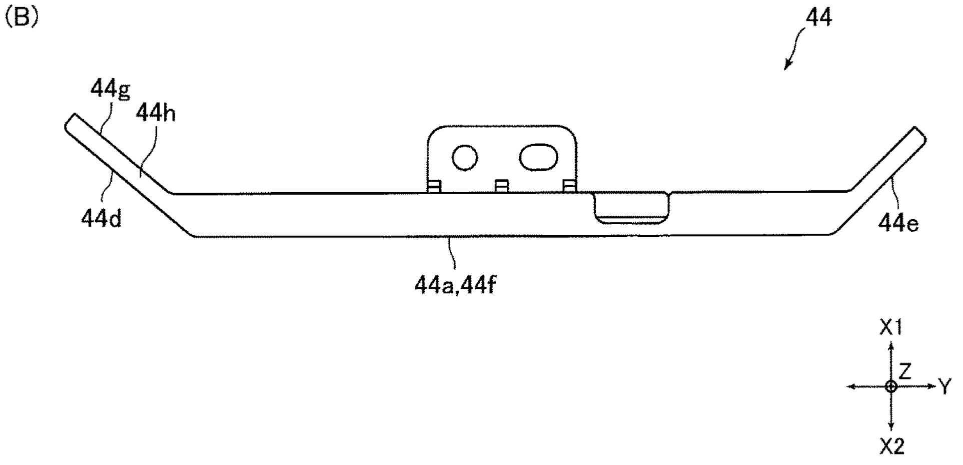
Figure 6:
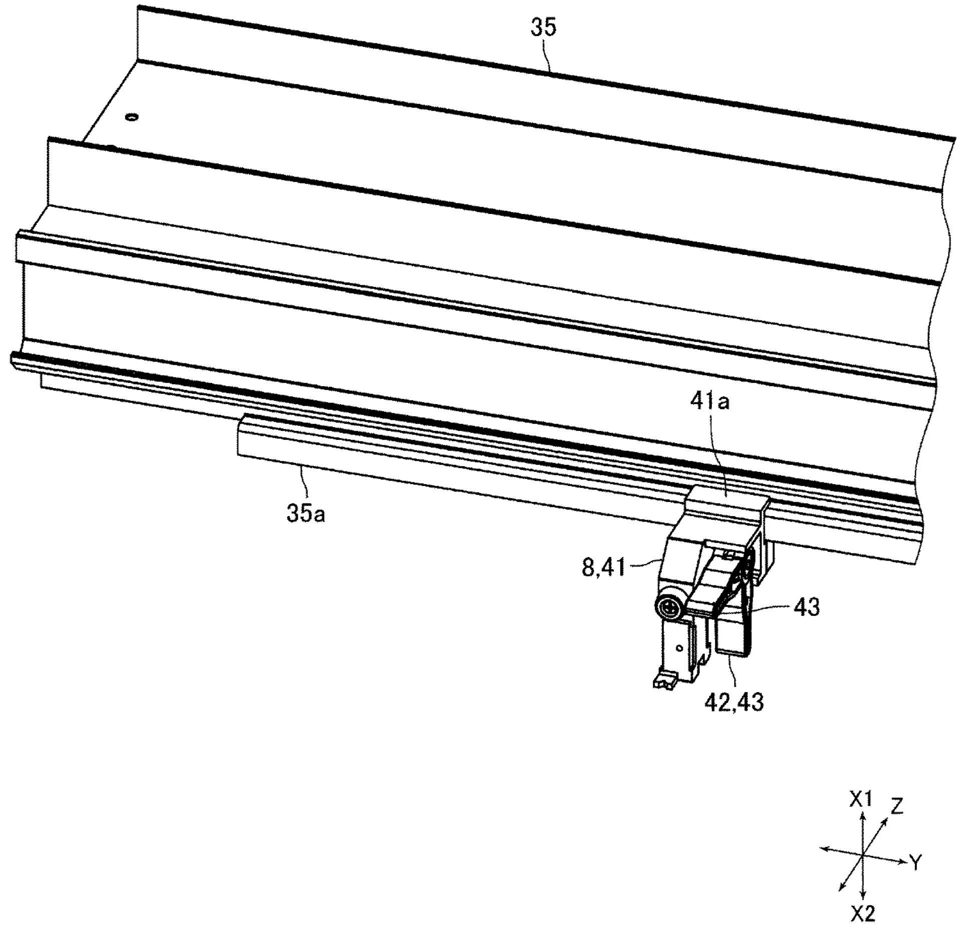
FIG. 6 is a perspective view of a part of a support frame illustrated in FIG. 3 and the second cutting mechanism.
Figure 7:
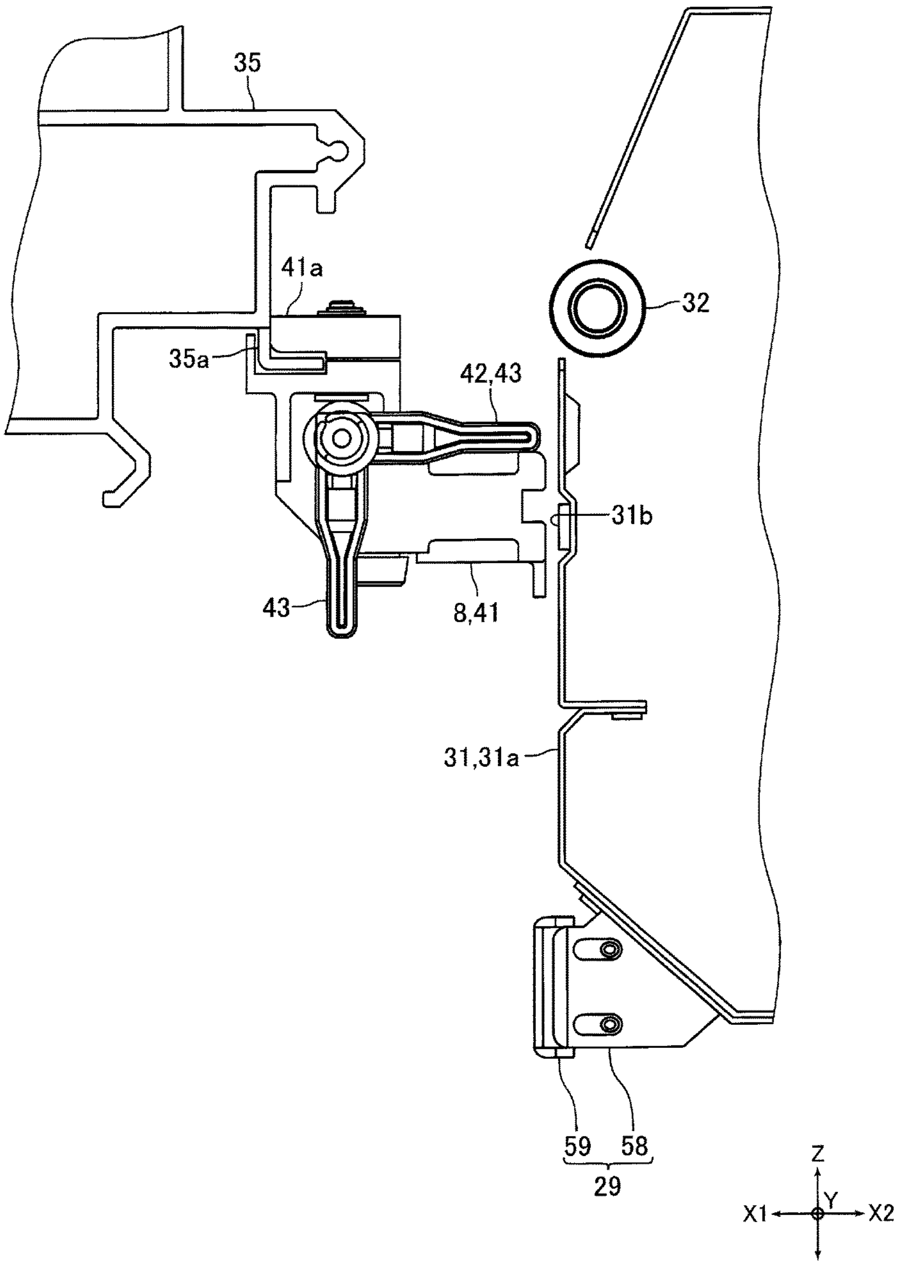
FIG. 7 is a side view of a part of the support frame, a part of a cutting platen, the second cutting mechanism, and the like illustrated in FIG. 3.
Figure 8:
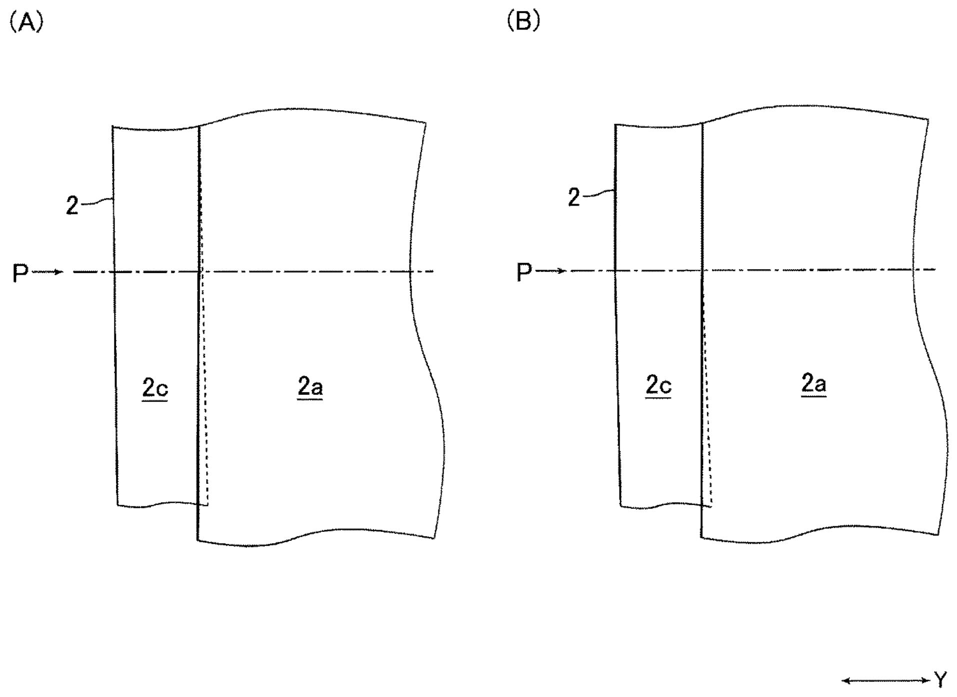
FIG. 8 is a view for describing an action of a guide member illustrated in FIG. 3.

FIG. 3 is an enlarged view of a portion E in FIG. 1. In FIG. 4, (A) is a perspective view of a part of the carriage 34, a medium pressing member 44, and the like of the cutting mechanism 7 illustrated in FIG. 3, and (B) is a plan view of a tip side portion of the cutter blade 38 of the cutting mechanism 7 illustrated in FIG. 3. In FIG. 5, (A) is a front view of the medium pressing member 44 illustrated in (A) of FIG. 4, and (B) is a plan view of the medium pressing member 44 illustrated in (A) of FIG. 4. FIG. 6 is a perspective view of a part of the support frame 35 and the second cutting mechanism 8 illustrated in FIG. 3. FIG. 7 is a side view of a part of the support frame 35, a part of the cutting platen 31, the second cutting mechanism 8, and the like illustrated in FIG. 3. FIG. 8 is a diagram for describing an action of the guide member 29 illustrated in FIG. 3.

As illustrated in FIG. 3, the cutting mechanism 7 is disposed downstream of the second cutting mechanism 8 in the transport direction of the medium 2. The second cutting mechanism 8 is disposed upstream of the cutting mechanism 7 in the transport direction of the medium 2. The second cutting mechanism 8 is disposed downstream of the tension bar 9 in the transport direction of the medium 2. The printing mechanism 3 is disposed upstream of the cutting mechanism 7 and the second cutting mechanism 8 in the transport direction of the medium 2.

As described above, the cutting mechanism 7 is disposed below the second cutting mechanism 8. A cutting platen 31 is disposed behind the cutting mechanism 7 and the second cutting mechanism 8. The cutting platen 31 faces the cutting mechanism 7 and the second cutting mechanism 8 from the rear side. That is, the printing device 1 includes the cutting platen 31 facing the cutting mechanism 7 and the second cutting mechanism 8 from the rear side.

The cutting platen 31 includes a facing portion 31*a* disposed to face the cutting mechanism 7 and a second facing portion 31*b* disposed to face the second cutting mechanism 8. A guide member 29 is attached to the cutting platen 31. The guide member 29 guides the cutting target portion 2*a* and the first margin portion 2*b* in a direction away from the second margin portion 2*c*.

That is, the printing device 1 includes the guide member 29 that guides the cutting target portion 2*a* and the first margin portion 2*b* in a direction away from the second margin portion 2*c*. The guide member 29 is fixed to a front lower end portion of the cutting platen 31.

At the location where the cutting mechanism 7 and the second cutting mechanism 8 are installed, the medium 2 is transported downward along the front surface of the cutting platen 31. In this case, the medium 2 sequentially passes between the second cutting mechanism 8 and the second facing portion 31*b* and between the cutting mechanism 7 and the facing portion 31*a*.

The tension bar 9 is disposed downstream of the print platen 24 and upstream of the cutting platen 31 in the transport direction of the medium 2. The cutting mechanism 7 and the second cutting mechanism 8 are disposed downstream of the tension bar 9 in the transport direction of the medium 2.

A second medium transport mechanism 30 that transports the long medium 2 in the longitudinal direction of the medium 2 is disposed between the tension bar 9 and the second cutting mechanism 8 in the transport direction of the medium 2. That is, the printing device 1 includes the second medium transport mechanism 30 that transports the medium 2, and the second medium transport mechanism 30 is disposed downstream of the tension bar 9 in the transport direction of the medium 2. Specifically, the transport roller 32 and the pad roller 33 (refer to FIG. 3) configuring the second medium transport mechanism 30 are disposed between the tension bar 9 and the second cutting mechanism 8 in the transport direction of the medium 2.

The transport roller 32 and the pad roller 33 are disposed above the second cutting mechanism 8. The pad roller 33 is disposed to face the transport roller 32 from the front side and is biased toward the transport roller 32. The transport roller 32 is connected to a drive mechanism that rotates the transport roller 32. The medium 2 is transported while being sandwiched between the transport roller 32 and the pad roller 33.

The cutting mechanism 7 includes a cutter blade 38 (refer to (B) of FIG. 4) that cuts the medium 2, a cutter holder 39 to which the cutter blade 38 is fixed, a carriage 34 (cutting carriage) that holds the cutter holder 39 so that the cutter holder 39 can be moved in the front-rear direction, and a holder drive mechanism that moves the cutter holder 39 in the front-rear direction with respect to the carriage 34. The holder drive mechanism includes a solenoid or the like.

The cutter blade 38 is held by the carriage 34 via the cutter holder 39. As illustrated in (B) of FIG. 4, the cutter blade 38 is a single-edged blade having a sharp edge. In (A) of FIG. 4, the cutter blade 38 is not illustrated.

The cutting mechanism 7 further includes a support frame 35 that supports the carriage 34 to be movable in the left-right direction (width direction of the medium 2), and a carriage drive mechanism 36 (cutting carriage drive mechanism) that moves the carriage 34 in the left-right direction with respect to the support frame 35. The support frame 35 is a long frame elongated in the left-right direction. Both end portions of the support frame 35 in the left-right direction are fixed to a front end portion of the side plate 37. A rear end portion of the side plate 37 is fixed to the support body 4 (refer to FIG. 1). The carriage drive mechanism 36 includes, for example, a belt partially fixed to the carriage 34, a pulley around which the belt is stretched, and a motor that rotates the pulley.

The cutting mechanism 7 also includes the medium pressing member 44 (refer to (A) of FIG. 4) that presses the medium 2 toward the facing portion 31*a* of the cutting platen 31. The medium pressing member 44 is attached to the carriage 34. Specifically, the medium pressing member 44 is attached to the rear surface of the carriage 34 and faces the facing portion 31*a* from the front side. The rear surface of the medium pressing member 44 is a facing surface 44*a* facing the facing portion 31*a* (refer to (B) of FIG. 5). That is, the medium pressing member 44 is provided with the facing surface 44*a* facing the facing portion 31*a*.

The medium pressing member 44 is provided with a through-hole 44*b* and a through-hole 44*c*. A part of the cutter blade 38 is disposed in the through-hole 44*b*. The through-hole 44*c* is provided to allow light emitted from a light emitting unit of a sensor 56 that will be described later mounted on the carriage 34 and light directed to a light receiving unit of the sensor 56 to pass therethrough. In the printing device 1, the through-holes 44*b* and 44*c* of the medium pressing member 44 penetrate through the medium pressing member 44 in the front-rear direction. In FIG. 3, the medium pressing member 44 is not illustrated.

Both end portions of the facing surface 44*a* in the left-right direction are inclined surfaces 44*d* and 44*e* that are inclined toward the front side toward the outside in the left-right direction. That is, both end portions of the facing surface 44*a* in the left-right direction are inclined surfaces 44*d* and 44*e* that are inclined toward a side away from the facing portion 31*a* toward the outside in the left-right direction. The inclined surfaces 44*d* and 44*e* are provided in a planar shape. A portion of the facing surface 44*a* between the inclined surface 44*d* and the inclined surface 44*e* is a planar medium pressing surface 44*f* orthogonal to the front-rear direction. The medium pressing surface 44*f* is provided in a rectangular shape.

In the present embodiment, in a case where the carriage 34 is moved to one side in the left-right direction (width direction of the medium 2), the cutter blade 38 protruding from the through-hole 44*b* toward the facing surface 44*a* is moved while cutting the medium 2. Here, an advancing direction side of the carriage 34 when the cutter blade 38 cuts the medium 2 will be referred to as a first direction side, and a side opposite to the first direction side will be referred to as a second direction side.

The inclined surface 44*d* is provided at an end portion of the facing surface 44*a* on the first direction side, and is inclined toward a side away from the facing portion 31*a* (that is, toward the front side) as it goes toward the first direction side. The inclined surface 44*d* is disposed on the first direction side (left side in (B) of FIG. 5) with respect to the cutter blade 38.

The inclined surface 44*e* is provided at an end portion of the facing surface 44*a* on the second direction side, and is inclined toward a side away from the facing portion 31*a* (that is, toward the front side) toward the second direction side.

As illustrated in (B) of FIG. 5, when viewed from the up-down direction, an inclination angle of the inclined surface 44*d* with respect to the left-right direction is smaller than an inclination angle of the inclined surface 44*e* with respect to the left-right direction. The inclination angle of the inclined surface 44*d* with respect to the left-right direction when viewed from the up-down direction is, for example, about 40°, and the inclination angle of the inclined surface 44*e* with respect to the left-right direction when viewed from the up-down direction is, for example, about 45°. When viewed from the up-down direction, the length of the inclined surface 44*d* is longer than the length of the inclined surface 44*e*.

The end portion of the medium pressing member 44 on the first direction side where the inclined surface 44*d* is provided is an inclined surface provision portion 44*g*. A lower end portion of the inclined surface provision portion 44*g* is an inclined surface 44*h* inclined upward toward the first direction side. That is, the end portion of the inclined surface provision portion 44*g* on the downstream side in the transport direction of the medium 2 is an inclined surface 44*h* inclined toward the upstream side in the transport direction of the medium 2 toward the first direction side.

A sensor 56 (refer to FIG. 10) that detects a cut position mark M1 that will be described later printed on the medium 2 is mounted on the carriage 34. That is, the printing device 1 includes the sensor (registration mark sensor) 56 that detects the cut position mark M1 printed on the medium 2. The sensor 56 is a reflective optical sensor, and includes a light emitting unit and a light receiving unit that receives light emitted from the light emitting unit and reflected by the medium 2. The light emitting unit of the sensor 56 emits light toward the rear side (the right side in FIG. 3). The sensor 56 is electrically connected to a cutting controller 63 that will be described later.

The second cutting mechanism 8 includes a cutter blade that cuts the medium 2. The cutter blade is, for example, a single-edged blade having a sharp edge. As illustrated in FIG. 7, the second cutting mechanism 8 includes a cutter holder 41 to which the cutter blade is fixed, and a clamp mechanism 42 that fixes the cutter holder 41 to the support frame 35.

The cutter holder 41 is attached to the support frame 35 to be movable in the left-right direction (Y direction). A position at which the cutter blade is fixed to the cutter holder 41 in the front-rear direction can be manually adjusted.

The support frame 35 is provided with a guide portion 35*a* that guides the cutter holder 41 in the left-right direction. The guide portion 35*a* is provided in a long shape elongated in the left-right direction. A shape of the guide portion 35*a* when viewed from the left-right direction is, for example, an L shape. The cutter holder 41 is provided with an engaging portion 41*a* that engages with the guide portion 35*a*. The engaging portion 41*a* can come into contact with the guide portion 35*a* from both sides in the front-rear direction and from both sides in the up-down direction.

The clamp mechanism 42 is attached to the cutter holder 41. The clamp mechanism 42 is, for example, a clamp mechanism using an eccentric cam. The clamp mechanism 42 includes a lever 43 rotatable with respect to the cutter holder 41 with the left-right direction as an axial direction of rotation. The lever 43 is rotatable between a clamp position where the engaging portion 41*a* of the cutter holder 41 is in contact with the guide portion 35*a* at a predetermined contact pressure, and an unclamp position where a gap is provided between the engaging portion 41*a* and the guide portion 35*a*. In the present embodiment, an operator of the printing device 1 moves the cutter holder 41 to a predetermined position along the guide portion 35*a* with the lever 43 in the unclamp position, and then rotates the lever 43 to the clamp position to fix the cutter holder 41 to the support frame 35.

A length of the guide portion 35*a* in the left-right direction is smaller than a length of the support frame 35 in the left-right direction (refer to FIG. 6). A gap is provided between one end (for example, a left end) of the guide portion 35*a* in the left-right direction and the side plate 37. In the case of FIG. 6, this gap is provided on the left side of the guide portion 35*a* in the drawing. This gap is wider than the second cutting mechanism 8 in the left-right direction.

In the present embodiment, the second cutting mechanism 8 can be attached to the support frame 35 and the second cutting mechanism 8 can be detached from the support frame 35 by using this gap. Specifically, in the case of FIG. 6, the second cutting mechanism 8 disposed in the gap is moved to the right side to engage the engaging portion 41*a* with the guide portion 35*a*, and thus the second cutting mechanism 8 can be attached to the support frame 35.

By moving the second cutting mechanism 8 attached to the support frame 35 to the gap on the left side in the drawing, the second cutting mechanism 8 can be detached from the support frame 35.

Therefore, in the present embodiment, the number of the second cutting mechanisms 8 attached to the support frame 35 can be changed. For example, as illustrated in (A) of FIG. 2, in a case where the two cut lines CL11 and CL12 in the transport direction of the medium 2 are formed on the medium 2 by the second cutting mechanism 8, the two second cutting mechanisms 8 are attached to predetermined positions of the support frame 35.

For example, as illustrated in (B) of FIG. 2, in a case where the four cut lines CL11 to CL14 in the transport direction of the medium 2 are formed on the medium 2 by the second cutting mechanism 8, the four second cutting mechanisms 8 are attached to predetermined positions of the support frame 35.

As illustrated in FIG. 3, the drive mechanism that rotates the transport roller 32, the transport roller 32, and the cutting platen 31 are attached to the side plate 37. The pad roller 33 is attached to the support frame 35. As described above, the support frame 35 is fixed to the side plate 37, and the side plate 37 is fixed to the support body 4. The side plate 37 is fixed to the support body 4 with a screw.

Thus, in the present embodiment, a unit including the cutting mechanism 7, the second cutting mechanism 8, the second medium transport mechanism 30, and the cutting platen 31 is attachable to and detachable from the support body 4. In the present embodiment, the cutting mechanism 7 and the second cutting mechanism 8 are fixed to the support body 4 via the side plate 37, and the printing mechanism 3, the cutting mechanism 7, and the second cutting mechanism 8 are attached to the same support body 4.

The guide member 29 is disposed below the cutting mechanism 7. The guide member 29 is disposed between the cutting mechanism 7 and the container 15 in the transport direction of the medium 2. That is, the guide member 29 is disposed between the second cutting mechanism 8 and the container 15 in the transport direction of the medium 2. The cutting mechanism 7 is disposed between the second cutting mechanism 8 and the guide member 29 in the transport direction of the medium 2. The guide member 29 is disposed at a position where the cutting target portion 2*a* and the first margin portion 2*b* are formed in the left-right direction.

As described above, the medium winding unit 17 is disposed behind the cutting mechanism 7 and the container 15. The second margin portion 2*c* is moved from the lower end of the front surface of the cutting platen 31 toward the rear side. On the other hand, the container 15 is disposed below the cutting mechanism 7, and the cutting target portion 2*a* and the first margin portion 2*b* are moved downward.

The guide member 29 guides the cutting target portion 2*a* and the first margin portion 2*b* to the front lower side such that the cutting target portion 2*a* and the first margin portion 2*b* are separated from the second margin portion 2*c*. That is, the guide member 29 guides the cutting target portion 2*a* and the first margin portion 2*b* in a direction away from the second margin portion 2*c* in the front-rear direction that is a thickness direction of the medium 2.

As illustrated in FIG. 3, the guide member 29 includes a fixed member 58 fixed to the cutting platen 31, and a contact member 59 in contact with the cutting target portion 2*a* and the first margin portion 2*b*. The fixed member 58 is fixed to the cutting platen 31 below the facing portion 31*a*. The fixed member 58 is fixed to the front lower end portion of the cutting platen 31. The contact member 59 is attached to the fixed member 58. A front surface of the contact member 59 is disposed ahead of the front surface of the cutting platen 31. The front surface of the contact member 59 is, for example, a flat surface orthogonal to the front-rear direction. The cutting target portion 2*a* and the first margin portion 2*b* pass through the front side of the contact member 59.

A position where the contact member 59 is attached to the fixed member 58 in the front-rear direction (left-right direction in FIG. 7) can be adjusted.

The contact member 59 is fixed to the fixed member 58 via, for example, a bolt and a nut. A long bolt insertion hole of which a longitudinal direction is the front-rear direction is provided in the fixed member 58. Therefore, the contact member 59 can adjust a position in the thickness direction (the longitudinal direction of the bolt insertion hole) of the medium 2 passing through the front side of the contact member 59.

Here, the second margin portion 2*c* wound by the medium winding mechanism 26 and moved toward the medium winding unit 17 is moved downward in (B) of FIG. 8 along the facing portion 31*a* of the cutting platen 31.

According to the study by the inventor of the present application, in a case where the guide member 29 is not installed, the second margin portion 2*c* moved toward the medium winding unit 17 may tilt toward the side (right side in (B) of FIG. 8) approaching the cutting target portion 2*a* moved toward the container 15.

For example, when the second margin portion 2*c* overlaps the end surface of the cutting target portion 2*a* below a predetermined position P downstream of the cutting mechanism 7 in the transport direction of the medium 2 as viewed from the front side of the printing device 1, the winding force from the medium winding mechanism 26 acts on the second margin portion 2*c*, so that a region where the end surface of the cutting target portion 2*a* and the end surface of the second margin portion 2*c* overlap may come into contact with each other with an excessive contact pressure. In such a case, wrinkles may occur in the cutting target portion 2*a*, or a jam in which the cutting target portion 2*a* or the second margin portion 2*c* is clogged may occur.

In the present embodiment, the guide member 29 is installed, and the cutting target portion 2*a* is guided by the guide member 29 in a direction away from the second margin portion 2*c* (the front direction in the drawing). Thus, as illustrated in (A) of FIG. 8, the cutting target portion 2*a* is located on the front side of the drawing with respect to the second margin portion 2*c* at the time point above the predetermined position P.

Thus, even if the second margin portion 2*c* wound by the medium winding mechanism 26 and moved toward the medium winding unit 17 tilts toward the cutting target portion 2*a* moved toward the container 15, the cutting target portion 2*a* and the second margin portion 2*c* are separated from each other in the front-rear direction, and it is possible to prevent the end surface of the cutting target portion 2*a* and the end surface of the second margin portion 2*c* guided in the direction away from the second margin portion 2*c* from coming into contact with each other with an excessive contact pressure.

In a case where the guide member 29 is installed, the cutting target portion 2*a* and the second margin portion 2*c* are separated from each other in the front-rear direction at the predetermined position P, and when viewed from the front side, the end portion of the second margin portion 2*c* overlaps the cutting target portion 2*a* (refer to (A) of FIG. 8).

(Configuration of Tension Applying Mechanism)

Figure 9:
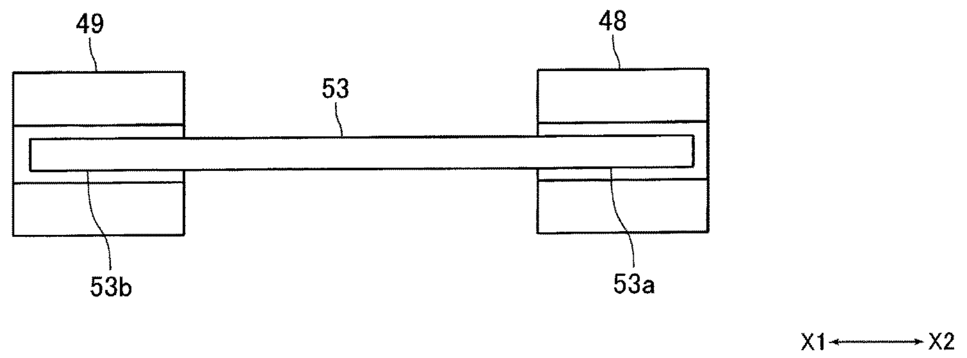
FIG. 9 is a side view of a first sensor and a second sensor that detects a position of a tension bar illustrated in FIG. 3.

FIG. 9 is a side view of the first sensor 48 and the second sensor 49 that detect a position of the tension bar 9 illustrated in FIG. 3.

The tension applying mechanism 10 includes, in addition to the tension bar 9, a tension coil spring 46 (biasing member: refer to FIG. 3) that biases the tension bar 9 in a direction of pressing the tension bar 9 against the medium 2, and a bar holding portion 47 that movably holds the tension bar 9. The tension applying mechanism 10 includes the first sensor 48 and the second sensor 49 that detect a position of the tension bar 9. The tension bar 9 is disposed behind the front surface of the cutting platen 31 (refer to FIG. 3). The tension bar 9 is disposed behind the lower end of the guide surface 25*a* of the after-printing platen 25 (refer to FIG. 1).

As illustrated in FIG. 3, the tension bar 9 includes a support shaft 50 provided in an elongated columnar shape, and a roller 51 rotatably held by the support shaft 50. The support shaft 50 is disposed such that an axial direction of the support shaft 50 coincides with the left-right direction (Y direction in the drawing).

The roller 51 is provided in a columnar shape elongated in the left-right direction. A length of the roller 51 in the left-right direction is smaller than a length of the support shaft 50 in the left-right direction. The support shaft 50 is inserted through the inner peripheral side of the roller 51, and the roller 51 is rotatable with respect to the support shaft 50 with the left-right direction as an axial direction of rotation. The roller 51 is in contact with the front surface of the medium 2. Both end portions of the support shaft 50 respectively project outward in the left-right direction from both end portions of the roller 51.

The bar holding portion 47 supports each of both end portions of the support shaft 50. The bar holding portion 47 is provided on the support member 52 disposed on both sides of the roller 51 in the left-right direction. A rear end portion of the support member 52 is fixed to the support body 4 (refer to FIG. 1). A guide groove 47*a* through which the end portion of the support shaft 50 is inserted is provided in the bar holding portion 47. The guide groove 47*a* is provided in a linear shape (slit shape) of which a longitudinal direction is the front-rear direction. The support shaft 50 is movable in the front-rear direction along the guide groove 47*a*. That is, the tension bar 9 is movable in the front-rear direction with respect to the bar holding portion 47.

The tension coil spring 46 is disposed on both sides of the roller 51 in the left-right direction. One end portion of the tension coil spring 46 is engaged with the end portion of the support shaft 50, and the other end portion of the tension coil spring 46 is engaged with the support member 52. The tension coil spring 46 biases the tension bar 9 toward the rear side. That is, the rear side (X2 direction side) of the present embodiment is a biasing direction side of the tension bar 9 by the tension coil spring 46. The front side (X1 direction side) is opposite to the biasing direction side, and the tension bar 9 is movable to the biasing direction side of the tension bar 9 by the tension coil spring 46 and the opposite side to the biasing direction side with respect to the bar holding portion 47.

As illustrated in FIG. 9, each of the first sensor 48 and the second sensor 49 is a transmissive optical sensor including a light emitting unit and a light receiving unit, and the light emitting unit and the light receiving unit are disposed to face each other with a space therebetween. The first sensor 48 and the second sensor 49 are attached to the support member 52 (refer to FIG. 3). The first sensor 48 and the second sensor 49 are disposed in a state of being spaced apart from each other in the front-rear direction. In the present embodiment, the first sensor 48 is disposed on the rear side, and the second sensor 49 is disposed on the front side. A light shielding member 53 is fixed to the support shaft 50 via a predetermined member. The light shielding member 53 is provided with a light shielding portion 53*a* capable of shielding between the light emitting unit and the light receiving unit of the first sensor 48, and a light shielding portion 53*b* capable of shielding between the light emitting unit and the light receiving unit of the second sensor 49.

As described above, the first sensor 48 is disposed behind the second sensor 49, and has a function of detecting a position of the tension bar 9 on the rear side. The second sensor 49 also has a function of detecting a position of the tension bar 9 on the front side. That is, the first sensor 48 has a function of detecting a position of the tension bar 9 on the biasing direction side of the tension bar 9 by the tension coil spring 46, and the second sensor 49 has a function of detecting a position of the tension bar 9 on the opposite side to the biasing direction side.

In the present embodiment, the medium transport mechanism 5 and the second medium transport mechanism 30 are controlled on the basis of detection results from the first sensor 48 and the second sensor 49, and the positions thereof are adjusted so that the tension bar 9 is disposed within a predetermined range in the front-rear direction.

That is, on the basis of the detection results from the first sensor 48 and the second sensor 49, a transport amount of the medium 2 using the medium transport mechanism 5 and a transport amount of the medium 2 using the second medium transport mechanism 30 are controlled, and the tension acting on the medium 2 from the tension bar 9 is adjusted to be a tension within a predetermined range. Specifically, the transport amount of the medium 2 is controlled on the basis of the detection results from the first sensor 48 and the second sensor 49 so that the tension bar 9 is disposed at a position where the light shielding portion 53*a* shields between the light emitting unit and the light receiving unit of the first sensor 48 and the light shielding portion 53*b* shields between the light emitting unit and the light receiving unit of the second sensor 49.

(Medium Printing Method and Cutting Method)

Figure 10:
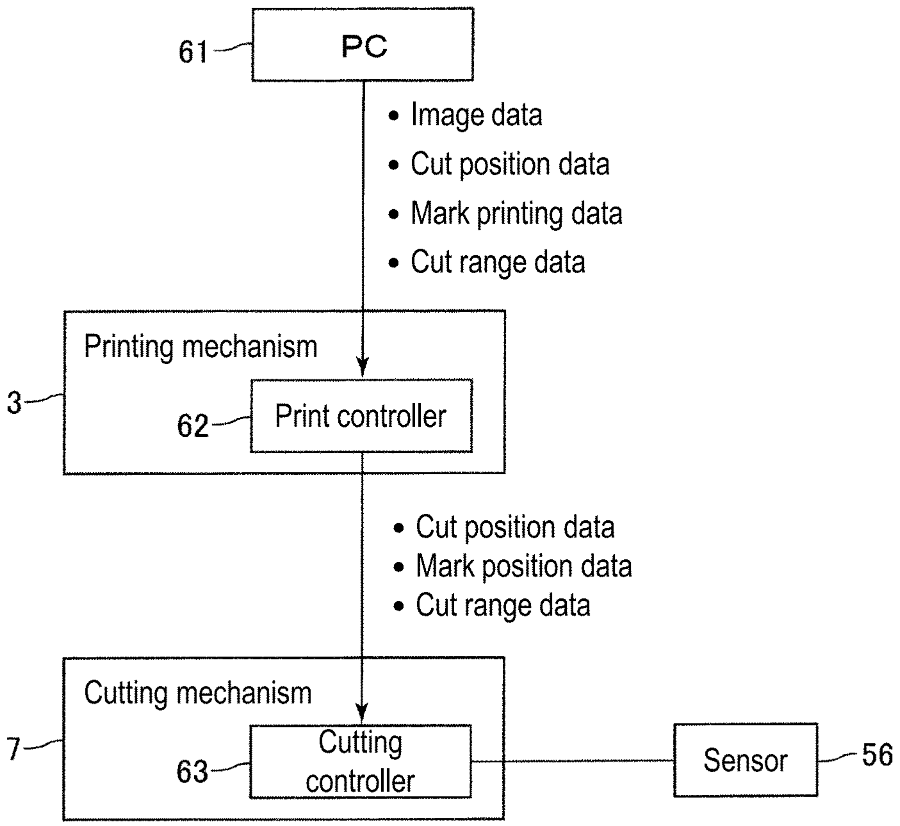
FIG. 10 is a block diagram for describing a configuration of the printing device illustrated in FIG. 1.

FIG. 10 is a block diagram for describing a configuration of the printing device 1 illustrated in FIG. 1.

When the printing device 1 of the present embodiment causes the printing mechanism 3 to perform printing on the medium 2, the medium 2 is cut by the cutting mechanism 7 and the second cutting mechanism 8 as it is, and the cutting target portion 2*a* is cut. In the present embodiment, the medium 2 that has passed through the after-printing platen 25 after printing is moved toward the tension bar 9 as indicated by a solid line in FIG. 1. When the cutting target portion 2*a* is cut, the second medium transport mechanism 30 transports the medium 2 on the cutting platen 31, so that the second cutting mechanism 8 forms the cut lines CL11 to CL14 in the medium transport direction on the medium 2. When the carriage 34 is moved in the left-right direction while the medium 2 on the cutting platen 31 is stopped, the cutting mechanism 7 forms the cut line CL1 parallel to the medium width direction (left-right direction).

As illustrated in FIG. 2, the printing mechanism 3 prints an image on the medium 2, and prints a cut position mark (register mark) M1 for specifying a medium cut position on the medium 2.

Here, the medium cut position is a position where the cut line CL1 is formed in the medium transport direction (up-down direction in FIG. 2). The cut line CL1 is a linear cutting region formed by the cutting mechanism 7 cutting the medium 2 after printing in the left-right direction.

The printing mechanism 3 prints the cut position mark M1 on one end portion of the medium 2 in the left-right direction. In (A) of FIG. 2, the cut position mark M1 is printed on the right end side in the left-right direction.

The cut position mark M1 is a straight line (line segment) parallel to the left-right direction, and is printed on a portion of the medium 2 that becomes the second margin portion 2*c*. The cut position mark M1 is printed at a position separated from the medium cut position by a certain distance on the transport direction downstream side. That is, the printing mechanism 3 prints a plurality of cut position marks M1 at positions separated from the plurality of respective medium cut positions by a certain distance on the transport direction downstream side. The plurality of cut position marks M1 are printed at the same position in the left-right direction.

In a personal computer 61 (refer to FIG. 10: reference sign PC) electrically connected to the printing device 1, the following data is created.

Image data that is data of an image to be printed on the medium 2 (specifically, an image to be printed on the cutting target portion 2*a*)

Cut position data that is data for specifying a medium cut position

Mark printing data that is data for printing the cut position mark M1

Cut range data that is data for specifying a medium cut range

Second cut position data that is data for specifying the second medium cut position Here, the medium cut range is a range (that is, a range in which the cut line CL1 is formed in the left-right direction) in which the medium 2 is cut at the medium cut position.

The second medium cut position is a position where the cut lines CL11 to CL14 are formed in the left-right direction of the medium 2 (left-right direction in (B) of FIG. 2). The cut lines CL11 to CL14 are linear cutting regions formed by the second cutting mechanism 8 cutting the medium 2 after printing in the transport direction.

For example, an operator of the printing device 1 creates these pieces of data on a display of the PC 61. Software for image creation and the like are installed in the PC 61. In the present embodiment, the printing device 1 and the PC 61 configure a printing system.

When the data is created in the PC 61, for example, the operator adjusts a position of the second cutting mechanism 8 in the left-right direction while checking the second medium cut position displayed on the display of the PC 61, and positions and fixes the second cutting mechanism 8 to the support frame 35.

When the operator performs a predetermined operation on the PC 61, the PC 61 transmits the created image data, the cut position data, the mark printing data, and the cut range data to a print controller 62 that is a controller of the printing mechanism 3, and the print controller 62 receives these pieces of data. That is, the printing mechanism 3 receives the pieces of data. The mark printing data includes mark position data that is data for specifying a position of the cut position mark M1 in the left-right direction.

The print controller 62 having received the image data, the cut position data, the mark printing data, and the cut range data corrects the cut position data, the cut range data, and the mark position data on the basis of the data of the position of the medium 2 in the left-right direction stored in the print controller 62, and transmits the corrected cut position data, cut range data, and mark position data to a cutting controller 63 that is a controller of the cutting mechanism 7, and the cutting controller 63 receives these pieces of data. That is, the cutting mechanism 7 receives these pieces of data.

The cutting controller 63 having received the cut position data, the cut range data, and the mark position data moves the carriage 34 to a position where the sensor 56 can detect the cut position mark M1 on the basis of the mark position data.

That is, the carriage drive mechanism 36 moves the carriage 34 to a position where the sensor 56 can detect the cut position mark M1 on the basis of the mark position data. When the medium 2 is cut by the cutting mechanism 7, this position becomes a reference position of the carriage 34, and the carriage 34 starts to be moved from this position. In this state, the printing mechanism 3 prints an image on the medium 2 on the basis of the image data, and prints the cut position mark M1 on the medium 2 on the basis of the mark printing data.

The cutting mechanism 7 cuts the medium 2 on the basis of the cut range data. In a case where the cutting mechanism 7 cuts the medium 2, the medium 2 on the cutting platen 31 is stopped. The stop position of the medium 2 is controlled on the basis of the detection result from the sensor 56 and the cut position data. Specifically, after the sensor 56 detects the cut position mark M1, when the medium 2 is transported by a predetermined amount by the second medium transport mechanism 30, the medium 2 is stopped and the cutting mechanism 7 cuts the medium 2.

In the present embodiment, when the light shielding portion 53*a* of the light shielding member 53 shields between the light emitting unit and the light receiving unit of the first sensor 48 and the light shielding portion 53*b* shields between the light emitting unit and the light receiving unit of the second sensor 49, the carriage 34 is movable in the left-right direction.

That is, in a case where the cutting mechanism 7 forms the cut line CL1, the tension bar 9 is disposed at a position where the light shielding portion 53*a* shields between the light emitting unit and the light receiving unit of the first sensor 48, and the light shielding portion 53*b* shields between the light emitting unit and the light receiving unit of the second sensor 49. In the present embodiment, even if the tension bar 9 is moved in the front-rear direction by a predetermined range, the light shielding portion 53*a* shields between the light emitting unit and the light receiving unit of the first sensor 48, and the light shielding portion 53*b* shields between the light emitting unit and the light receiving unit of the second sensor 49.

Embodiment 2

(Configuration of Printing Device, and Medium Printing Method and Cutting Method)

Figure 11:
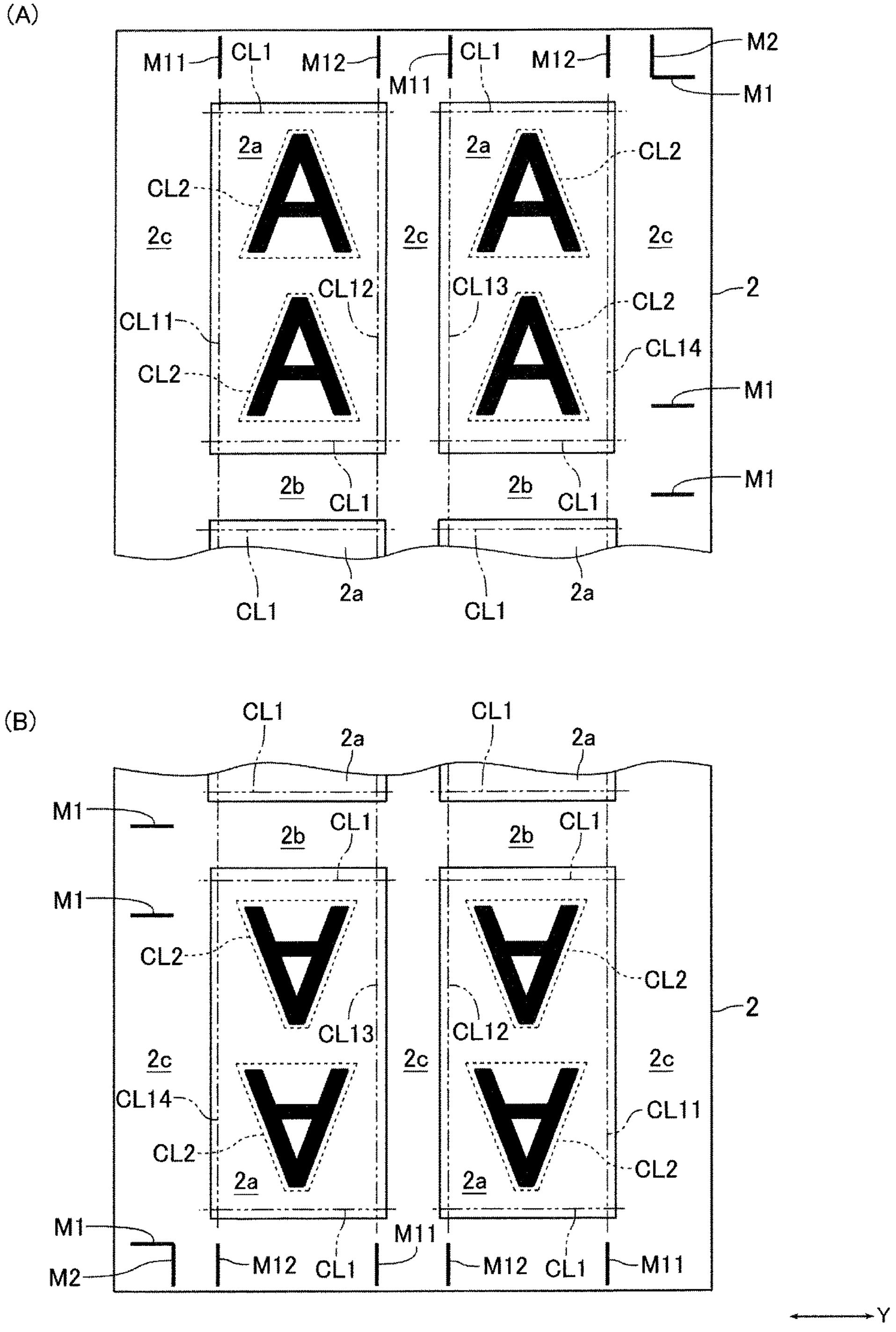
FIG. 11 is a diagram for describing a medium printing method and a medium cutting method according to Embodiment 2 of the present invention.
Figure 12:
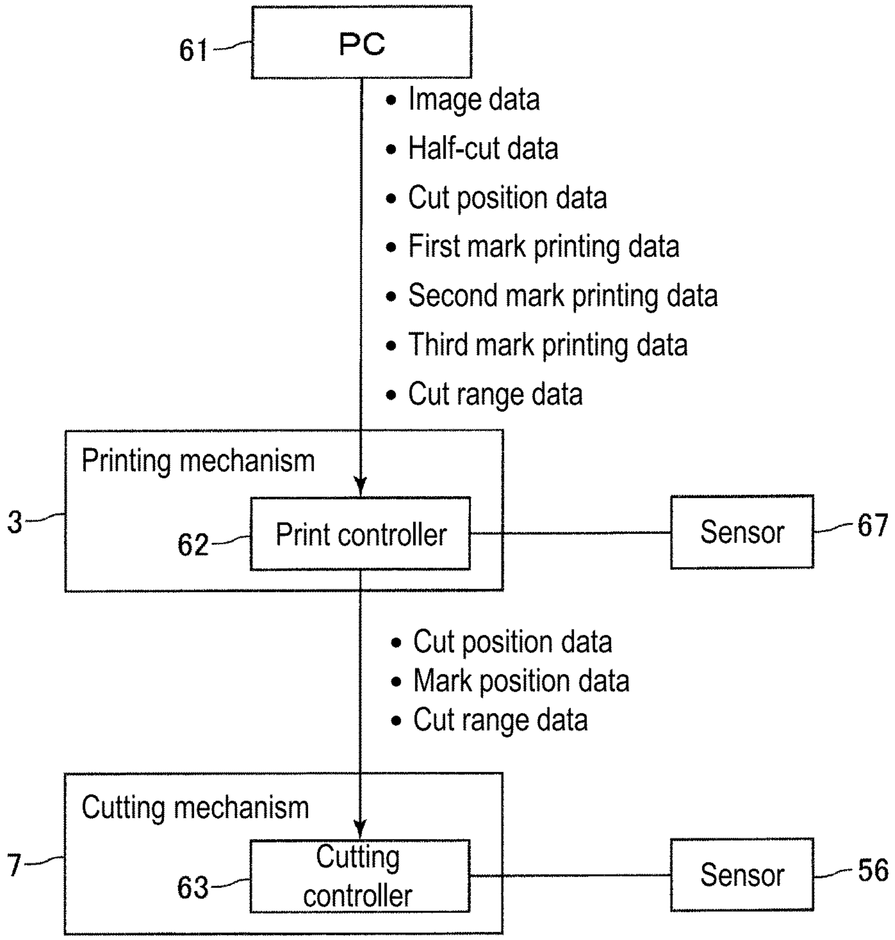
FIG. 12 is a block diagram for describing a configuration of a printing device according to Embodiment 2 of the present invention.

FIG. 11 is a diagram for describing a printing method and a cutting method for a medium 2 according to Embodiment 2 of the present invention. FIG. 12 is a block diagram for describing a configuration of a printing device 1 according to Embodiment 2 of the present invention.

Similarly to the printing device 1 of Embodiment 1, the printing device 1 of the present embodiment performs printing on the long medium 2 cut after printing. In the printing device 1 of Embodiment 1, printing of the medium 2 using the printing mechanism 3 and cutting of the medium 2 using the cutting mechanism 7 and the second cutting mechanism 8 are performed.

In contrast, in the present embodiment, for example, the medium 2 includes a mount and a sealant releasably attached to the mount, and in the printing device 1, in addition to the printing of the medium 2 using the printing mechanism 3 and the cutting of the medium 2 using the cutting mechanism 7 and the second cutting mechanism 8, half-cutting of the medium 2 in which only the sealant is cut into a predetermined shape according to an image printed on the sealant of the medium 2 is performed. Hereinafter, a configuration and the like of the printing device 1 of the present embodiment will be described focusing on differences from Embodiment 1.

The printing mechanism 3 of the present embodiment includes a cutting head 66 (refer to FIG. 1) that half-cuts the medium 2. The cutting head 66 is mounted on the carriage 21 and is movable in the left-right direction. The cutting head 66 includes, for example, a cutter blade, a cutter holder that rotatably holds the cutter blade, and a lifting mechanism that lifts and lowers the cutter holder.

In the cutter holder, the cutter blade is held to be rotatable with the up-down direction as an axial direction of rotation.

The medium 2 is half-cut by the cutting head 66 after printing of the medium 2.

When a portion of the medium 2 half-cut by the cutting head 66 is defined as a half-cut line CL2, the half-cut line CL2 surrounding an image is formed on the medium 2 half-cut by the cutting head 66, for example, as illustrated in FIG. 11. When the medium 2 is half-cut, the medium 2 is transported to the transport direction downstream side, the medium 2 is transported to the transport direction upstream side, and the medium 2 is transported to both sides in the medium transport direction.

When the medium 2 is sandwiched between the transport roller 32 (refer to FIG. 3) and the pad roller 33 (refer to FIG. 3) in the stopped state, the medium 2 cannot be transported to the transport direction upstream side by a predetermined amount or more by the medium transport mechanism 5.

Even if the pad roller 33 can be retracted and it is possible to create a situation in which the medium 2 is not sandwiched between the transport roller 32 and the pad roller 33, when the medium 2 is cut by the cutting mechanism 7 and the second cutting mechanism 8 in a situation where the medium 2 is transported to both sides in the medium transport direction, there is a probability that the medium 2 cannot be appropriately cut in the medium width direction and the medium transport direction due to the influence of the medium 2 being transported to the transport direction upstream side.

Therefore, in the present embodiment, the medium 2 after printing and half-cutting is temporarily wound into a roll shape by the medium winding mechanism 26 (refer to FIG. 1) without being cut by the cutting mechanism 7 and the second cutting mechanism 8, and then an operator detaches the roll-shaped medium 2 from the medium winding unit 17 and attaches the medium 2 to the medium feed unit 14.

The medium 2 after the printing and half-cutting wound in a roll shape is refed from the medium feed unit 14, and cut by the cutting mechanism 7 and the second cutting mechanism 8. That is, when the medium 2 after the printing mechanism 3 performs printing and after being detached from the medium winding unit 17 is used as a post-printing medium, the post-printing medium wound in a roll shape is attached to the medium feed unit 14. The cutting mechanism 7 and the second cutting mechanism 8 cut the post-printing medium.

In the present embodiment, the transport direction downstream side end of the medium 2 when printing and half-cutting are performed is the transport direction upstream side end of the medium 2 when cutting is performed by the cutting mechanism 7 and the second cutting mechanism 8, and the transport direction upstream side end of the medium 2 when printing and half-cutting are performed is a transport direction downstream side end of the medium 2 when cutting is performed by the cutting mechanism 7 and the second cutting mechanism 8.

The right end of the medium 2 when printing and half-cutting are performed becomes the left end of the medium 2 when cutting is performed by the cutting mechanism 7 and the second cutting mechanism 8. The left end of the medium 2 when printing and half-cutting are performed becomes the right end of the medium 2 when cutting is performed by the cutting mechanism 7 and the second cutting mechanism 8.

In FIG. 11, (A) is a diagram for describing a state of the end portion on the transport direction upstream side of the medium 2 before being detached from the medium winding unit 17 after printing and the half-cutting are completed. In FIG. 11, (B) is a diagram for describing a state of the end portion on the transport direction downstream side of the medium 2 attached to the medium feed unit 14 after printing and half-cutting are completed and the medium 2 is detached from the medium winding unit 17.

In the present embodiment, the medium 2 is not cut by the cutting mechanism 7 and the second cutting mechanism 8 when printing and half-cutting of the medium 2 are performed. Thus, the medium 2 that has passed through the after-printing platen 25 after printing and half-cutting passes through the front side of the cutting mechanism 7, the second cutting mechanism 8, and the tension applying mechanism 10 as indicated by a two-dot chain line in FIG. 1. The medium 2 passes under the cutting mechanism 7 and is then wound by the medium winding mechanism 26.

On the other hand, when the medium 2 is cut by the cutting mechanism 7 and the second cutting mechanism 8, similarly to that in Embodiment 1, the medium 2 that has passed through the after-printing platen 25 is moved toward the tension bar 9 (refer to the solid line in FIG. 1). When the medium 2 is cut by the cutting mechanism 7 and the second cutting mechanism 8, the medium 2 passes on the print platen 24.

In the present embodiment, when printing and half-cutting of the medium 2 are performed, the medium winding unit 17 holds the winding roll 16 around which the medium 2 after printing and half-cutting is wound in a roll shape. On the other hand, when the medium 2 is cut by the cutting mechanism 7 and the second cutting mechanism 8, the medium winding unit 17 holds the winding roll 16 around which the second margin portion 2*c* is wound in a roll shape similarly to that in Embodiment 1.

In the present embodiment, a sensor 67 (refer to FIG. 12) that detects a first cut range mark M11 and a second cut range mark M12 that will be described later to be printed on the medium 2 is mounted on the carriage 21 of the printing mechanism 3.

That is, the printing device 1 includes the sensor 67 that detects the first cut range mark M11 and the second cut range mark M12, and the sensor 67 is disposed further toward the transport direction upstream side than the cutting mechanism 7. The sensor 67 is a reflective optical sensor similarly to the sensor 56, and includes a light emitting unit and a light receiving unit that receives light emitted from the light emitting unit and reflected by the medium 2. The light emitting unit of the sensor 67 emits light downward. The sensor 67 is electrically connected to the print controller 62.

Similarly to Embodiment 1, assuming that the cut range (that is, the range in which the cut line CL1 is formed in the left-right direction) of the medium 2 in the left-right direction at the medium cut position is a medium cut range, the printing mechanism 3 of the present embodiment prints an image and the cut position mark M1 on the medium 2, and prints the first cut range mark M11 disposed at a position corresponding to one end of the medium cut range in the left-right direction, the second cut range mark M12 disposed at a position corresponding to the other end of the medium cut range in the left-right direction, and an origin specifying mark M2 for specifying the origin on the medium 2.

Here, the medium cut range is a range in the left-right direction of the cut line CL1 formed on the medium 2.

Similarly to Embodiment 1, the cut position mark M1 is a straight line (line segment) parallel to the left-right direction. The printing mechanism 3 prints the cut position mark M1 on one end portion of the medium 2 in the left-right direction, which will become the second margin portion 2*c*. The cut position mark M1 of the present embodiment is printed at a position separated from the medium cut position by a certain distance on the transport direction upstream side (refer to (A) of FIG. 11). That is, the printing mechanism 3 prints the plurality of cut position marks M1 at positions separated from the plurality of respective medium cut positions by a certain distance on the transport direction upstream side.

The first cut range mark M11 and the second cut range mark M12 are straight lines (line segments) parallel to the medium transport direction. The printing mechanism 3 prints the first cut range mark M11 and the second cut range mark M12 at positions corresponding to end portions on the transport direction upstream side of the medium 2 wound by the medium winding unit 17.

For example, as illustrated in FIG. 11, in a case where two cutting target portions 2 a are arranged side by side in the width direction of the medium 2, the printing mechanism 3 prints two first cut range marks M11 and two second cut range marks M12.

In the present embodiment, the printing mechanism 3 prints the first cut range mark M11 on the inside in the left-right direction from one end of the medium cut range in the left-right direction, and prints the second cut range mark M12 on the inside in the left-right direction from the other end of the medium cut range in the left-right direction.

Similarly to Embodiment 1, the printing mechanism 3 prints the first cut range mark M11 and the second cut range mark M12 at the same position as the second medium cut position in the left-right direction.

The second medium cut positions are positions where the cut lines CL11 to CL14 are formed in the left-right direction (left-right direction in (A) of FIG. 11) of the medium 2. The cut lines CL11 to CL14 are linear cutting regions formed by the second cutting mechanism 8 cutting the medium 2 in the medium transport direction.

The printing mechanism 3 may print the first cut range mark M11 and the second cut range mark M12 on the first margin portion 2*b* at a predetermined pitch in the medium transport direction in addition to the first cut range mark M11 and the second cut range mark M12 printed on the end portion on the transport direction upstream side of the medium 2 wound by the medium winding unit 17.

The origin specifying mark M2 is a straight line (line segment) parallel to the medium transport direction. The printing mechanism 3 prints the origin specifying mark M2 at a position to become an end portion on the transport direction upstream side on the medium 2 wound by the medium winding unit 17. For example, the transport direction downstream side end of the origin specifying mark M2 is connected to the inner end in the left-right direction of the cut position mark M1 printed on the most transport direction upstream side, and the origin specifying mark M2 is printed on one end portion of the medium 2 in the left-right direction, which will become the second margin portion 2*c*.

In the present embodiment, before the medium 2 is subjected to printing and half-cutting, the PC 61 creates the following data.

- Image data that is data of an image to be printed on the medium 2 (specifically, an image to be printed on the cutting target portion 2*a*)
- Half-cutting data that is data for half-cutting the medium 2
- Cut position data that is data for specifying a medium cut position
- First mark printing data that is data for printing the cut position mark M1 on the medium 2
- Cut range data that is data for specifying a medium cut range
- Second cut position data that is data for specifying the second medium cut position Before the medium 2 is subjected to printing and half-cutting, the PC 61 generates the following data.

- Second mark printing data that is data for printing the first cut range mark M11 and the second cut range mark M12 on the medium 2.
- Third mark printing data that is data for printing the origin specifying mark M2 on the medium 2

For example, an operator of the printing device 1 creates these pieces of data on a display of the PC 61. After the PC 61 creates these pieces of data, when an operator performs a predetermined operation on the PC 61, the PC 61 transmits the created image data, half-cutting data, cut position data, first mark printing data, second mark printing data, third mark printing data, and cut range data to the print controller 62, and the print controller 62 receives the data. That is, the printing mechanism 3 receives the pieces of data.

The printing mechanism 3 that has received the data prints an image on the medium 2 on the basis of the image data, prints a plurality of cut position marks M1 on the medium 2 on the basis of the first mark printing data, prints the first cut range mark M11 and the second cut range mark M12 on the basis of the second mark printing data, and prints the origin specifying mark M2 on the basis of the third mark printing data. After the medium 2 is subjected to printing, the printing mechanism 3 half-cuts the medium 2 on the basis of the half-cutting data.

As described above, when the medium 2 is subjected to printing and half-cutting, the medium 2 is set so that the medium 2 that has passed through the after-printing platen 25 after the printing and half-cutting passes through the front side of the cutting mechanism 7, the second cutting mechanism 8, and the tension applying mechanism 10, and the lower side of the cutting mechanism 7, and then is wound by the medium winding mechanism 26.

The medium 2 after the printing and half-cutting is wound into a roll shape by the medium winding mechanism 26 (refer to FIG. 1) and detached from the medium winding unit 17 by the operator. The roll-shaped medium 2 after printing and half-cutting, detached from the medium winding unit 17, is attached to a medium feed unit 14 (refer to FIG. 1) by the operator. The roll-shaped medium 2 attached to the medium feed unit 14 is pulled out by the operator, and the end portion of the medium 2 on the transport direction downstream side is disposed on the print platen 24.

Thereafter, the sensor 67 detects the origin specifying mark M2 (refer to (A) of FIG. 11) and detects the cut position mark M1 (that is, the cut position mark M1 printed on the most transport direction downstream side) connected to the transport direction upstream side end of the origin specifying mark M2.

The print controller 62 specifies an origin position on the basis of the detection result from the sensor 67. In the present embodiment, for example, a position of a connection point between the origin specifying mark M2 and the cut position mark M1 is the origin position of the medium 2. Thereafter, the sensor 67 detects the first cut range mark M11 and the second cut range mark M12. The sensor 67 of the present embodiment is a second mark detection mechanism that detects the first cut range mark M11 and the second cut range mark M12 printed on the post-printing medium.

In a case where the sensor 67 detects the origin specifying mark M2, the first cut range mark M11, and the second cut range mark M12, the carriage 21 is moved in the left-right direction. In a case where the sensor 67 detects the cut position mark M1, the medium transport mechanism 5 transports the medium 2.

Before the sensor 67 detects the origin specifying mark M2 and the cut position mark M1, the position of the carriage 21 in the left-right direction and the position of the end portion of the medium 2 on the transport direction downstream side in the medium transport direction are adjusted by the operator. Specifically, a laser pointer that emits a laser beam toward the lower side is mounted on the carriage 21, and the operator adjusts the position of the carriage 21 and the position of the end portion of the medium 2 on the transport direction downstream side while checking the laser beam with which the medium 2 is irradiated from the laser pointer.

The print controller 62 generates mark position data that is data for specifying a position of the cut position mark M1 in the left-right direction on the basis of the detection result of the cut position mark M1 from the sensor 67. The print controller 62 corrects the cut range data on the basis of the detection results of the first cut range mark M11 and the second cut range mark M12 from the sensor 67, and generates the corrected cut range data.

The print controller 62 transmits the cut position data, the mark position data, and the corrected cut range data to the cutting controller 63, and the cutting controller 63 receives these pieces of data. That is, the cutting mechanism 7 receives these pieces of data.

The cutting controller 63 having received the cut position data, the cut range data, and the mark position data moves the carriage 34 to a position where the sensor 56 can detect the cut position mark M1 on the basis of the mark position data. That is, the carriage drive mechanism 36 moves the carriage 34 to a position where the sensor 56 can detect the cut position mark M1 on the basis of the mark position data received by the cutting mechanism 7. When the medium 2 is cut by the cutting mechanism 7, this position becomes a reference position of the carriage 34, and the carriage 34 starts to be moved from this position.

For example, the operator fixes the second cutting mechanism 8 to the support frame 35 by adjusting the position of the second cutting mechanism 8 in the left-right direction by using the first cut range mark M11 and the second cut range mark M12 printed at the same position as the second medium cut position in the left-right direction as marks. Thereafter, the medium 2 is cut by the second cutting mechanism 8 and the medium 2 is cut by the cutting mechanism 7.

Similarly to Embodiment 1, when the second medium transport mechanism 30 transports the medium 2, the second cutting mechanism 8 cuts the medium 2. The cutting mechanism 7 cuts the medium 2 on the basis of the cut range data. In a case where the cutting mechanism 7 cuts the medium 2, the medium 2 on the cutting platen 31 is stopped. Similarly to Embodiment 1, also in the present embodiment, a stop position of the medium 2 is controlled on the basis of the detection result from the sensor 56 and the cut position data. Specifically, after the sensor 56 detects the cut position mark M1, when the medium 2 is transported by a predetermined amount by the second medium transport mechanism 30, the medium 2 is stopped and the cutting mechanism 7 cuts the medium 2.

The sensor 56 of the present embodiment is a first mark detection mechanism that detects the cut position mark M1 printed on the post-printing medium. When the medium 2 is cut by the cutting mechanism 7, the cut position mark M1 is disposed at a position separated from the medium cut position on the transport direction downstream side by a certain distance (refer to (B) of FIG. 11).

As described above, in the present embodiment, the cutting mechanism 7 cuts the medium 2 in the left-right direction on the basis of the cut range data (that is, the cut range data received by the cutting mechanism 7 from the print controller 62) corrected on the basis of the detection results of the first cut range mark M11 and the second cut range mark M12 from the sensor 67, and the detection result from the sensor 56. That is, the cutting mechanism 7 cuts the medium 2 in the left-right direction on the basis of the detection results from the sensors 56 and 67.

In a case where the first cut range mark M11 and the second cut range mark M12 are printed on the first margin portion 2*b*, the sensor 67 may detect the origin specifying mark M2, the cut position mark M1, the first cut range mark M11, and the second cut range mark M12 again after the cutting mechanism 7 and the second cutting mechanism 8 start to cut the medium 2.

In this case, the print controller 62 generates the mark position data again, corrects the cut range data, and transmits the cut position data, the mark position data, and the corrected cut range data to the cutting controller 63.

Main Effects of the Present Embodiment

As described above, in the printing device 1 of the present embodiment, the printing mechanism 3 prints the plurality of cut position marks M1 at positions separated from the plurality of respective medium cut positions by a certain distance on the transport direction upstream side on the basis of the first mark printing data. As described above, when the medium 2 after being subjected to printing by the printing mechanism 3 and after being detached from the medium winding unit 17 is used as a post-printing medium, in the post-printing medium attached to the medium feed unit 14 and refed from the medium feed unit 14, the cut position mark M1 is disposed at a position separated from each of the medium cut positions by a certain distance on the transport direction downstream side.

Thus, in the present embodiment, even in a case where the post-printing medium is refed and cut in the medium width direction and the medium transport direction, the medium cut position can be recognized on the basis of the cut position mark M1.

In the present embodiment, the printing mechanism 3 prints the first cut range mark M11 and the second cut range mark M12 on the basis of the second mark printing data.

Thus, in the present embodiment, the medium cut range can be recognized on the basis of the first cut range mark M11 and the second cut range mark M12 even in a case where a part of the post-printing medium refed from the medium feed unit 14 in the medium width direction is cut in the medium width direction.

As described above, in the present embodiment, even in a case where the post-printing medium refed from the medium feed unit 14 is cut in the medium width direction and the medium transport direction, and a part of the post-printing medium in the medium width direction is cut in the medium width direction, it is possible to recognize the medium cut position and the medium cut range for appropriately cutting the post-printing medium in the medium width direction on the basis of the cut position mark M1, the first cut range mark M11, and the second cut range mark M12.

That is, in the present embodiment, even in a case where the post-printing medium is refed and cut in the medium width direction and the medium transport direction, and even when a part of the post-printing medium in the medium width direction is cut in the medium width direction, a mark for appropriately cutting the post-printing medium in the medium width direction can be printed.

In the present embodiment, in a case where the post-printing medium is refed and cut, predetermined data stored in the PC 61 is transmitted to the print controller 62, and the print controller 62 transmits the predetermined data to the cutting controller 63, so that the cutting mechanism 7 can recognize the medium cut position and the medium cut range for appropriately cutting the post-printing medium in the medium width direction. However, in this case, the PC 61 needs to keep storing the data until the post-printing medium is refed and cut. In this case, it is necessary to associate the post-printing medium refed from the medium feed unit 14 with the data transmitted from the PC 61. On the other hand, in the present embodiment, in a case where the PC 61 transmits data to the printing mechanism 3 when printing is performed by the printing mechanism 3, it is not necessary to keep storing the data. In the present embodiment, it is not necessary to associate the data with the post-printing medium refed from the medium feed unit 14. In the present embodiment, the first cut range mark M11 and the second cut range mark M12 are printed at the same position as the second medium cut position in the medium width direction.

Therefore, in the present embodiment, as described above, the operator can fix the second cutting mechanism 8 to the support frame 35 by adjusting the position of the second cutting mechanism 8 in the medium width direction by using the first cut range mark M11 and the second cut range mark M12 as marks.

In the present embodiment, the printing mechanism 3, the cutting mechanism 7, and the second cutting mechanism 8 are attached to the same support body 4. Therefore, in the present embodiment, a configuration of the printing device 1 can be simplified compared with a case where a support body to which the printing mechanism 3 is attached and a support body to which the cutting mechanism 7 and the second cutting mechanism 8 are attached are separately provided. In the present embodiment, since the post-printing medium wound in a roll shape is attached to the medium feed unit 14, a configuration of the printing device 1 can be simplified compared with a case where a feed unit to which a roll-shaped post-printing medium is attached is separately provided in addition to the medium feed unit 14.

In the present embodiment, the sensor 67 is mounted on the carriage 21 of the printing mechanism 3.

Thus, in the present embodiment, the first cut range mark M11, the second cut range mark M12, and the like can be detected by the sensor 67 by using an operation of the carriage 21. Therefore, in the present embodiment, a configuration of the printing device 1 can be simplified compared with a case where a carriage on which the sensor 67 is mounted is separately provided in addition to the carriage 21.

In the present embodiment, the carriage drive mechanism 36 moves the carriage 34 to a position where the sensor 56 can detect the cut position mark M1 on the basis of the mark position data, and moves the carriage 34 to a position where the sensor 56 can detect the cut position mark M1 in advance and stops the carriage. Therefore, in the present embodiment, when the cutting mechanism 7 cuts the post-printing medium, the sensor 56 can quickly detect the cut position mark M1.

Modified Example of Embodiment 2

In Embodiment 2, the first cut range mark M11 and the second cut range mark M12 are printed on the portion of the medium 2 avoiding the cutting target portion 2*a*, but a part of the first cut range mark M11 and a part of the second cut range mark M12 may be printed on the cutting target portion 2*a*. In this case, since the lengths of the first cut range mark M11 and the second cut range mark M12 in the medium transport direction are large, a position of the second cutting mechanism 8 can be easily adjusted in a case where the position of the second cutting mechanism 8 in the left-right direction is adjusted by using the first cut range mark M11 and the second cut range mark M12 as marks.

In Embodiment 2, the first cut range mark M11 and the second cut range mark M12 may be printed at positions shifted from the second medium cut position in the left-right direction.

For example, the first cut range mark M11 may be printed at the same position as one end of the medium cut range in the left-right direction, and the second cut range mark M12 may be printed at the same position as the other end of the medium cut range in the left-right direction. The first cut range mark M11 may be printed on the outside in the left-right direction from one end of the medium cut range in the left-right direction, and the second cut range mark M12 may be printed on the outside in the left-right direction from the other end of the medium cut range in the left-right direction. In these cases, a mark used as a mark for adjusting a position of the second cutting mechanism 8 in the left-right direction may be printed on the medium 2.

In Embodiment 2, the sensor 67 needs not be mounted on the carriage 21 of the printing mechanism 3. In this case, for example, a carriage on which the sensor 67 is mounted is separately provided in addition to the carriage 21.

In Embodiment 2, the sensor 56 needs not be mounted on the carriage 34 of the cutting mechanism 7. In this case, for example, a carriage on which the sensor 56 is mounted is separately provided in addition to the carriage 34.

In Embodiment 2, the sensor 56 may detect the first cut range mark M11 and the second cut range mark M12. In this case, the sensor 56 is a first mark detection mechanism that detects the cut position mark M1 printed on the post-printing medium, and is a second mark detection mechanism that detects the first cut range mark M11 and the second cut range mark M12 printed on the post-printing medium. In this case, the sensor 56 detects the origin specifying mark M2 and detects the cut position mark M1 connected to the transport direction upstream side end of the origin specifying mark M2.

In Embodiment 2, a support body to which the printing mechanism 3 is attached and a support body to which the cutting mechanism 7 and the second cutting mechanism 8 are attached may be separately provided. In this case, for example, a feed unit to which a roll-shaped post-printing medium is attached may be separately provided in addition to the medium feed unit 14. In Embodiment 2, the printing device 1 needs not include the cutting mechanism 7 and the second cutting mechanism 8. In this case, a cutting device including the cutting mechanism 7 and the second cutting mechanism 8 is separately installed, and the medium 2 after being subjected to printing and half-cutting by the printing device 1 is cut by this cutting device.

In Embodiment 2, instead of half-cutting the medium 2, a perforation having a predetermined shape corresponding to an image printed on the medium 2 may be formed on the medium 2 after printing. In this case, for example, the medium 2 is made of paper, and the cutting head 66 forms a perforation on the medium 2 after printing. In this case, for example, a cut line of a perforation having the same shape as the half-cut line CL2 is formed on the medium 2. In Embodiment 2, instead of half-cutting the medium 2, the medium 2 may be cut out by cutting out a part of the medium 2 after printing for decoration. In Embodiment 2, a predetermined process may be performed on the medium 2 instead of half-cutting the medium 2, forming perforations in the medium 2, and cutting out the medium 2. Even in this case, the medium 2 is transported to both sides in the medium transport direction when the predetermined process is performed on the medium 2.

In Embodiment 2, the medium 2 subjected to only printing may be attached to the medium feed unit 14 and cut by the cutting mechanism 7 and the second cutting mechanism 8 after being wound in a roll shape by the medium winding mechanism 26 and detached from the medium winding unit 17 without being cut by the cutting mechanism 7 and the second cutting mechanism 8. In this case, for example, a predetermined process is performed on the medium 2 before the roll-shaped medium 2 after printing, detached from the medium winding unit 17, is attached to the medium feed unit 14.

Other Embodiments

The above-described embodiments are examples of a preferred embodiment of the present invention, but is not limited thereto, and various modifications can be made without changing the concept of the present invention.

Figure 13:
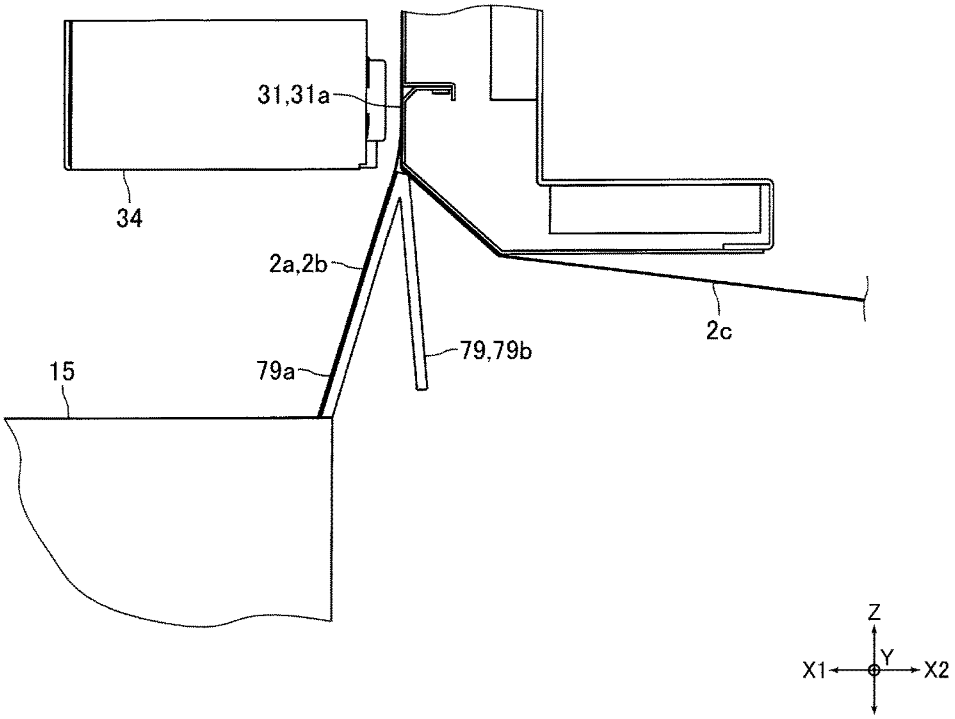
FIG. 13 is a side view for describing a configuration of a guide member according to another embodiment of the present invention.

In the embodiments described above, the printing device 1 may include, instead of the guide member 29, a guide member 79 (refer to FIG. 13) that guides the cutting target portion 2*a* and the first margin portion 2*b* in a direction away from the second margin portion 2*c*. The guide member 79 is attached to the container 15, for example. Specifically, the guide member 79 is attached to the rear upper end portion of the container 15. The guide member 79 is disposed below the cutting mechanism 7 and is disposed between the cutting mechanism 7 and the container 15 in the medium transport direction. The guide member 79 is disposed at a position where the cutting target portion 2*a* and the first margin portion 2*b* are formed in the left-right direction.

The guide member 79 is provided with, for example, an inclined surface 79*a* that is inclined downward toward the front side, and the cutting target portion 2*a* and the first margin portion 2*b* are guided to the front lower side to be separated from the second margin portion 2*c* by the inclined surface 79*a*. The guide member 79 is provided with an inclined surface 79*b* that is inclined downward toward the rear side. The inclined surface 79*b* is disposed behind the inclined surface 79*a*, and an upper end of the inclined surface 79*a* and an upper end of the inclined surface 79*b* are connected. Note that the guide member 79 may be provided integrally with the container 15.

In the embodiments described above, the cutting mechanism 7 may be disposed between the tension bar 9 and the second cutting mechanism 8 in the transport direction of the medium 2. In the embodiments described above, the heater 6 needs not be disposed between the printing mechanism 3 and the tension bar 9 in the transport direction of the medium 2. In the embodiments described above, the first margin portion 2*b* between the cutting target portions 2*a* in the medium transport direction needs not be formed. In the embodiments described above, the printing device 1 may be a printer other than an inkjet printer.

The invention claimed is:

1. A printing device that performs printing on a medium that is long and to be cut after printing, the printing device comprising:

- a printing mechanism, configured to perform printing on the medium;
- a medium transport mechanism, configured to transport the medium in a longitudinal direction of the medium;
- a medium feed unit to which the medium wound in a roll shape before being transported toward the printing mechanism is attached; and
- a medium winding unit to which the medium wound in a roll shape after passing through the printing mechanism is attached, wherein

- when a width direction of the medium orthogonal to a medium transport direction that is a transport direction of the medium is defined as a medium width direction,
- a side on which the medium feed unit is disposed in the medium transport direction is defined as a transport direction upstream side,
- a side on which the medium winding unit is disposed in the medium transport direction is defined as a transport direction downstream side,
- a cut position in the medium transport direction of the medium linearly cut in the medium width direction after printing is defined as a medium cut position, and
- a cut range of the medium in the medium width direction at the medium cut position is defined as a medium cut range, wherein the printing mechanism is configured to:

- receive an image data that is data of an image to be printed on the medium,
  - a first mark printing data that is data for printing a cut position mark for specifying the medium cut position on the medium, and
  - a second mark printing data that is data for printing, on the medium, a first cut range mark disposed at a position corresponding to one end of the medium cut range in the medium width direction and a second cut range mark disposed at a position corresponding to the other end of the medium cut range in the medium width direction;
- print the image on the medium on the basis of the image data;
- print a plurality of the cut position marks at positions separated by a certain distance from the plurality of respective medium cut positions on the transport direction upstream side on the basis of the first mark printing data; and print the first cut range mark and the second cut range mark on the medium on the basis of the second mark printing data.

2. The printing device as set forth in claim 1, wherein the cut position mark is a straight line parallel to the medium width direction, the first cut range mark and the second cut range mark are straight lines parallel to the medium transport direction, and the printing mechanism is configured to:

print the cut position mark on one end portion of the medium in the medium width direction, and print the first cut range mark and the second cut range mark on at least an end portion of the medium on the transport direction upstream side in a state in which the medium is wound by the medium winding unit.

3. The printing device as set forth in claim 2, wherein when a cut position in the medium width direction of the medium linearly cut in the medium transport direction after printing is defined as a second medium cut position, the printing mechanism is configured to print the first cut range mark and the second cut range mark at the same position as the second medium cut position in the medium width direction.

4. The printing device as set forth in claim 1, wherein when the medium after the printing mechanism performs printing and after being detached from the medium winding unit is a post-printing medium, the printing device further comprises:

a first mark detection mechanism, configured to detect the cut position mark printed on the post-printing medium;

a second mark detection mechanism, configured to detect the first cut range mark and the second cut range mark printed on the post-printing medium;

a cutting mechanism, configured to cut the post-printing medium in the medium width direction; and a second cutting mechanism, configured to cut the post-printing medium in the medium transport direction, wherein the cutting mechanism is configured to cut the post-printing medium in the medium width direction on the basis of detection results from the first mark detection mechanism and the second mark detection mechanism.

5. The printing device as set forth in claim 4, wherein the printing mechanism, the cutting mechanism, and the second cutting mechanism are attached to the same support body, and the post-printing medium wound in a roll shape is attached to the medium feed unit.

6. The printing device as set forth in claim 4, wherein the cutting mechanism includes:

a cutter blade, configured to cut the post-printing medium;

a cutting carriage, configured to hold the cutter blade; and a cutting carriage drive mechanism, configured to move the cutting carriage in the medium width direction, wherein the first mark detection mechanism is mounted on the cutting carriage, the second mark detection mechanism is disposed further toward the transport direction upstream side than the cutting mechanism, and the cutting mechanism is configured to:

receive the cut range data that is data for specifying the medium cut range and is generated on the basis of detection results of the first cut range mark and the second cut range mark from the second mark detection mechanism, and cut the post-printing medium in the medium width direction on the basis of the received cut range data and a detection result from the first mark detection mechanism.

7. The printing device as set forth in claim 6, wherein the printing mechanism includes:

an inkjet head, configured to eject ink onto the medium;

a printing carriage on which the inkjet head is mounted; and a printing carriage drive mechanism, configured to move the printing carriage in the medium width direction, and is disposed further toward the transport direction upstream side than the cutting mechanism and the second cutting mechanism, wherein the second mark detection mechanism is mounted on the printing carriage.

8. The printing device as set forth in claim 6, wherein the second mark detection mechanism is configured to detect the cut position mark printed on the post-printing medium, the cutting mechanism is configured to receive a mark position data that is generated on the basis of a detection result of the cut position mark from the second mark detection mechanism and is data for specifying a position of the cut position mark in the medium width direction, and the cutting carriage drive mechanism is configured to move the cutting carriage to a position where the first mark detection mechanism is capable of detecting the cut position mark on the basis of the mark position data received by the cutting mechanism.

9. The printing device as set forth in claim 2, wherein when the medium after the printing mechanism performs printing and after being detached from the medium winding unit is a post-printing medium, the printing device further comprises:

a first mark detection mechanism, configured to detect the cut position mark printed on the post-printing medium;

a second mark detection mechanism, configured to detect the first cut range mark and the second cut range mark printed on the post-printing medium;

a cutting mechanism, configured to cut the post-printing medium in the medium width direction; and a second cutting mechanism, configured to cut the post-printing medium in the medium transport direction, wherein the cutting mechanism is configured to cut the post-printing medium in the medium width direction on the basis of detection results from the first mark detection mechanism and the second mark detection mechanism.

10. The printing device as set forth in claim 9, wherein the printing mechanism, the cutting mechanism, and the second cutting mechanism are attached to the same support body, and the post-printing medium wound in a roll shape is attached to the medium feed unit.

11. The printing device as set forth in claim 3, wherein when the medium after the printing mechanism performs printing and after being detached from the medium winding unit is a post-printing medium, the printing device further comprises:

a first mark detection mechanism, configured to detect the cut position mark printed on the post-printing medium;

a second mark detection mechanism, configured to detect the first cut range mark and the second cut range mark printed on the post-printing medium;

a cutting mechanism, configured to cut the post-printing medium in the medium width direction; and a second cutting mechanism, configured to cut the post-printing medium in the medium transport direction, wherein the cutting mechanism is configured to cut the post-printing medium in the medium width direction on the basis of detection results from the first mark detection mechanism and the second mark detection mechanism.

12. The printing device as set forth in claim 11, wherein the printing mechanism, the cutting mechanism, and the second cutting mechanism are attached to the same support body, and the post-printing medium wound in a roll shape is attached to the medium feed unit.

* * * * *